United States Patent
Rahat et al.

(10) Patent No.: US 10,154,371 B1
(45) Date of Patent: Dec. 11, 2018

(54) RESPONSE AT NETWORK TERMINAL TO INITIALIZATION FAILURE

(71) Applicant: T-Mobile USA, Inc., Bellevue, WA (US)

(72) Inventors: Adnan Rahat, Renton, WA (US); Hsin-Fu Henry Chiang, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/889,676

(22) Filed: Feb. 6, 2018

(51) Int. Cl.
*H04W 4/00* (2018.01)
*H04W 4/02* (2018.01)
*H04W 76/18* (2018.01)
*H04W 48/16* (2009.01)

(52) U.S. Cl.
CPC ............ *H04W 4/02* (2013.01); *H04W 48/16* (2013.01); *H04W 76/18* (2018.02)

(58) Field of Classification Search
CPC ........ H04W 4/02; H04W 48/16; H04W 76/18
USPC .......... 455/434, 435.1, 410, 411, 418, 456.1
See application file for complete search history.

(56) References Cited

U.S. PATENT DOCUMENTS

| | | | | |
|---|---|---|---|---|
| 2012/0094666 | A1* | 4/2012 | Awoniyi | H04W 48/16 455/435.1 |
| 2012/0190363 | A1* | 7/2012 | Maeda | H04W 48/02 455/435.1 |
| 2013/0260745 | A1* | 10/2013 | Johansson | H04W 24/02 455/423 |
| 2014/0018039 | A1 | 1/2014 | Lau | |

OTHER PUBLICATIONS

"ETSI TS 124 229 v10.9.0, Technical Specification", Nov. 2012, pp. 1, 64-68, 71, 86-87, and 93-94.
Rosenberg, J., "A Session Initiation Protocol (SIP) Event Package for Registrations", RFC 3680 (Standards Track), Mar. 2004, pp. 2-7.
Peterson, J., "A Presence-based GEOPRIV Location Object Format", RFC 4119 (Standards Track), Dec. 2005, pp. 1-4.
Winterbottom, et al., "GEOPRIV Presence Information Data Format Location Object (PIDF-LO) Usage Clarification, Considerations, and Recommendations", RFC 5491 (Standards Track), Mar. 2009, pp. 2, and 4-7.

* cited by examiner

*Primary Examiner* — Nghi H Ly
(74) *Attorney, Agent, or Firm* — Lee & Hayes, PC; Robert C. Peck; Christopher J. White

(57) ABSTRACT

Example techniques described herein can permit network terminals to respond to initialization failures, e.g., failures associated with specific types of access networks. A terminal can receive, from a core network device, an initialization-failure message indicating the core network devices lacks valid information of a particular type, e.g., location information, associated with the terminal. The terminal can enable its information-determining function of the terminal, e.g., a location sensor, and determine information of the type using the information-determining function. The terminal can transmit, to the core network device, an initialization message comprising the first information. In some examples, the initialization message can include a Presence Information Data Format Location Object (PIDF-LO) record indicating the location of the terminal.

19 Claims, 10 Drawing Sheets

US 10,154,371 B1

RESPONSE AT NETWORK TERMINAL TO INITIALIZATION FAILURE

CROSS-REFERENCE TO RELATED APPLICATIONS

Not applicable.

BACKGROUND

A computing device configured for telecommunications, such as a wireless smartphone or other terminal, is generally capable of communicating via various wireless access networks. However, some access networks may not provide functions required by the terminal to use particular network services. This can restrict a user's ability to access particular services.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items. The attached drawings are for purposes of illustration and are not necessarily to scale. For brevity of illustration, in the diagrams herein, an arrow beginning with a diamond connects a first component or operation (at the diamond end) to at least one second component or operation that is or can be included in the first component or operation.

DETAILED DESCRIPTION

Overview

Figure 1:
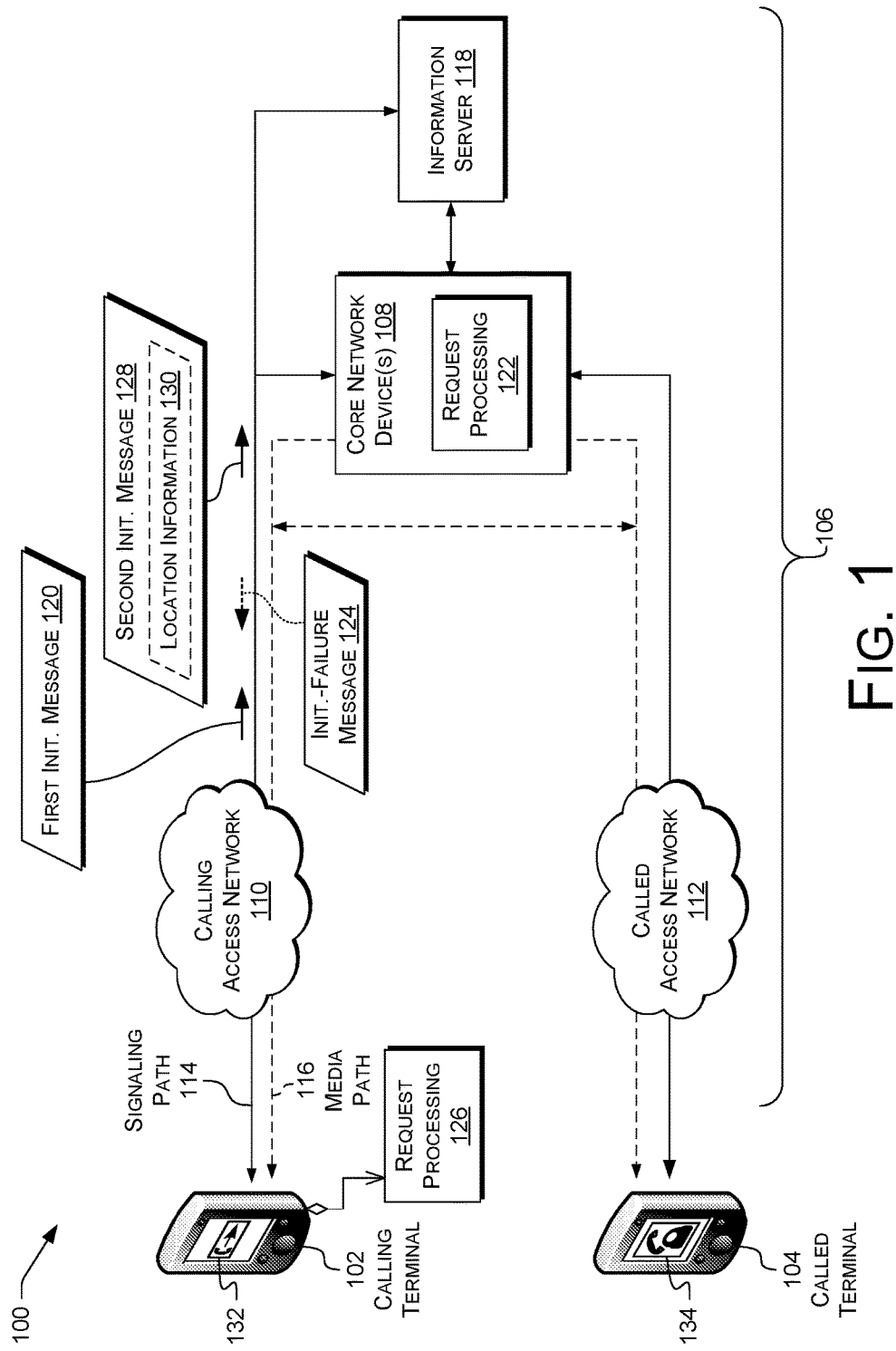
FIG. 1 is a block diagram illustrating a telecommunication system according to some implementations.

Systems and techniques described herein permit computing devices to more effectively communicate via telecommunications networks. The term "session" as used herein includes a communications path via at least one telecommunications network for exchange of data among two or more computing devices, referred to for brevity as "terminals." Example sessions include voice and video calls, e.g., by which human beings converse, a data communication session, e.g., between two electronic systems or between an electronic system and a human being, or a Rich Communication Services (RCS) session.

Telecommunications networks may include a core network operated by one or more service providers ("carriers"), such as one or more cellular-telephony providers. The core network is connected via access networks to terminals. Terminals can be operated by users ("subscribers"), or can be autonomous. Example access networks carrying traffic of sessions can include second-generation (2G), third-generation (3G), or fourth-generation (4G) cellular networks, or wireless data networks such as Institute of Electrical and Electronics Engineers (IEEE) 802.11 (WIFI) networks carrying voice over Internet Protocol (VoIP) calls. Some examples relate to Long Term Evolution (LTE) cellular networks carrying Voice over LTE (VoLTE) sessions using Session Initiation Protocol (SIP) signaling.

The introduction of WIFI calling (WFC) has given subscribers of a carrier network the ability to make calls in areas where they do not have cellular coverage by using an available WIFI access point (AP) as an access network or component thereof. The WIFI AP can be used by the subscribers' terminal to access the carrier's network using WIFI calling, e.g., in lieu of VoLTE, which uses a cell site to access the carrier network. Despite this benefit, an attempt to utilize WIFI calling may sometimes result in the carrier network prohibiting service to the terminal. For example, U.S. Federal regulations specify that telephony subscribers are to have a reasonable expectation that they can dial 911 and be routed to the nearest public safety answering point. The carrier cannot provide this reasonable expectation if it cannot ascertain a subscriber's location. Thus, in a situation where a subscriber's 911 location is not ascertainable, the subscriber's terminal, in attempting to subscribe for registration status (e.g., by sending a SIP request using the SUBSCRIBE method), may receive a subscription error (e.g., 403 forbidden), or a SIP response using the NOTIFY method to specify a terminated registration status. These are examples of initialization-failure messages. An initialization-failure message indicates that a particular service (e.g., voice calling service over WIFI) is prohibited for the terminal attempting to initialize communications.

A missing 911 location may be an "unrecoverable" error in the sense that the lack of a 911 address will never be resolved as long as the 911 location remains unascertainable, regardless of how many times the terminal attempts to register for service. Some prior schemes may therefore be caught in a continuous loop of registration failures when 911 location is missing. The more terminals that are concurrently engaged in similar registration attempts, the larger the amount of network traffic that is created, causing large-scale needless network bandwidth consumption. In some instances, a large number of terminals may be continuously sending, and re-sending, registration attempts to the carrier network, which can result in a complete network outage.

Described herein are techniques and systems for improved handling, by a terminal, of issues encountered during initialization (e.g., during subscription for registration status). In some examples, before establishing a communication session (e.g., a voice call), a terminal is configured to subscribe for registration status by transmitting a subscription request, such as a SIP request using the SUBSCRIBE method. The subscription request is transmitted to an IMS node, e.g., a proxy call session control function (P-CSCF) node. In response to the subscription request, the terminal can receive various types of subscription responses from the IMS node. When the terminal receives a 200 OK SIP response followed by an additional SIP response using the NOTIFY method and specifying an active registration status, the terminal is successfully registered for service. If the subscription request was a first attempt at subscribing for registration status, the terminal is considered herein to have not encountered any issues during the terminal's subscription for registration status.

However, there are instances where the terminal can encounter an issue in attempting to subscribe for registration status. For purposes of the discussion herein, any subscription response from the IMS node other than the above-mentioned 200 OK SIP response is an "initialization-failure message" indicating an error (sometimes referred to as a "subscription error") in subscribing. Various types of subscription errors can be specified in a subscription response, including, without limitation, a SIP 3xx, 4xx, 5xx, or 6xx error type. Additionally or alternatively, the IMS node ca first transmit a 200 OK SIP response to the terminal followed by a SIP response that notifies the terminal of a terminated registration status (e.g., a SIP request using the NOTIFY method specifying a terminated registration status). In this example, the NOTIFY request is an initialization-failure message. In response to an initialization-failure message, e.g., indicating a subscription error, techniques and systems disclosed herein can be implemented by the terminal to respond to the encountered issue in an improved manner, as compared to existing terminal procedures.

In general, processes are disclosed herein for implementation on a terminal with improved handling of issues encountered during initialization of communications with a network. Also disclosed herein are systems and devices comprising one or more processors and one or more memories, as well as non-transitory computer-readable media (CRM) storing computer-executable instructions that, when executed, by one or more processors perform various acts and/or processes disclosed herein.

FIGS. 1-7 are described with respect to initialization failures due to a lack of valid location information. However, corresponding techniques can be used for other types of information. Some examples of other types of information are described herein with reference to FIGS. 8 and 9.

Illustrative Examples

FIG. 1 is a block diagram illustrating a telecommunication system 100 according to some examples. The system includes terminals 102 and 104, e.g., user equipment or other mobile phones or communications-capable computing devices, communicatively connectable with a telecommunications network 106. The terminals 102 and 104 can be operated, e.g., by a first user and a second user respectively (not shown), e.g., to place a call from terminal 102 to terminal 104. The terminals 102 and 104 are communicatively connected to one or more core network device(s) 108, e.g., via respective access networks 110 and 112. For brevity, access networks 110 and 112 are referred to herein as "calling" and "called" access networks, respectively, by analogy with the calling terminal (terminal 102) and the called terminal (terminal 104). However, techniques described herein are not limited to either the calling or the called side, but can be used with either or both. The core network device(s) 108 can include, e.g., one or more ASes, such as an RCS Messaging Server (RMS) or a telephony application server (TAS). Access networks 110 and 112 can include, e.g., LTE access networks, WIFI networks, or access networks of other types described herein. For brevity, other components of telecommunications network 106 are omitted. For example, a serving call session control function (S-CSCF) can relay communications from terminal 102 between access network 110 and core network device 108, e.g., an Application Server (AS). For brevity, the discussion of FIG. 1 focuses on terminal 102 and core network device 108. However, functions described with reference to terminal 102 can additionally or alternatively be performed by terminal 104, unless otherwise specified in this document.

In some examples, a user can utilize the terminal 102 to communicate with other users and associated terminals via an IMS core (sometimes referred to as the "IMS core network," the "IMS network," the "Core Network (CN)," or the "IM CN Subsystem"). For example, a service provider may offer multimedia telephony services that allow a subscribed user to call or message other users via the IMS core using terminal 102. A subscriber can also utilize an associated terminal 102, 104 to receive, provide, or otherwise interact with various different IMS-based services by accessing the IMS core. FIG. 1 illustrates an example core network device 108 that the terminal 102 can communicate with for these purposes. In some embodiments, the core network device 108 represents a P-CSCF node, but the core network device 108 can represent any other suitable core network device.

An operator of the IMS core may offer any type of IMS-based service, such as telephony services, emergency services (e.g., E911), gaming services, instant messaging services, presence services, video conferencing services, social networking and sharing services, location-based services, push-to-talk services, and so on. In order to access these services (e.g., telephony services), a terminal is configured to request establishment of a communication session. In the case of telephony services, the communication session can comprise a call (i.e., a voice-based communication session, such as a VoLTE call, or a WIFI call).

The terminals 102 and 104 can be implemented as any suitable mobile terminals configured to communicate over a wireless and/or wireline network, including, without limitation, a mobile phone (e.g., a smart phone), a tablet computer, a laptop computer, a portable digital assistant (PDA), a wearable computer (e.g., electronic/smart glasses, a smart watch, fitness trackers, etc.), an in-vehicle (e.g., in-car) computer, a networked digital camera, and/or similar mobile devices. Although this description predominantly describes the terminals 102 and 104 as being "mobile" or "wireless," (e.g., configured to be carried and moved around), it is to be appreciated that the terminals 102 and 104 can represent various types of communication devices that are generally stationary as well, such as televisions or similar devices (e.g., smart televisions or set-top boxes, STBs), desktop computers, game consoles, set top boxes, and the like. In this sense, the terms "communication device," "wireless device," "wireless communication device," "wireline device," "mobile device," "terminal," "user equipment (UE)," "client device," and "terminal" may be used interchangeably herein to describe any communication or terminal capable of performing techniques described herein with respect to, e.g., terminals 102 and 104. For example, some terminals can be capable of communicating via multiple access networks, e.g., WIFI access networks, and can register via one or more of those networks at any particular time.

Terminals 102 and 104 can communicate at least three types of information: registration information, signaling information, and media information. In the illustrated example, registration information and signaling information are carried via signaling path 114. Signaling path 114 can additionally carry presence information or location information. Media information is carried via media path 116, depicted for clarity using dashed lines. The illustrated paths can represent different packet flows along a common network, along different networks, or any combination thereof.

Registration information can include information useful for establishing that a terminal 102 or 104 is eligible to receive service, e.g., SIP REGISTER or SUBSCRIBE requests, or 802.1X, RADIUS, or Diameter authentication-protocol messages. Signaling information can include information relating to call setup and teardown, e.g., SIP INVITE or BYE requests, or SIP 100 Trying, 180 Ringing, 183 Session Progress, or 200 OK responses. Media information can include audio, video, or other user-specified or user-accessible data of a communication session, e.g., carried via the Real-time Transport Protocol (RTP) and encoded using a selected codec. Nonlimiting example codecs can include an adaptive multi-rate (AMR) or International Telecommunications Union (ITU) G.711 audio codec, or an ITU H.263 or Moving Picture Experts Group (MPEG) MPEG-4 video or audiovisual codec.

Various use cases for mobile communications involve a position of terminal 102, e.g., a UE. For example, emergency services such as "9-1-1" in the US and "1-1-2" in Europe can use the position of terminal 102 to route emergency calls to the appropriate Public Safety Answering Point (PSAP) or to direct first responders to the terminal 102. Search services can use the position of terminal 102 to limit the spatial range of results returned for queries such as "nearby restaurants" or "Mike Oldfield tour stops," e.g., to results within a predetermined distance of the terminal 102. Mapping services can show the position of terminal 102 on a map or provide turn-by-turn directions.

As used herein, the "position" of a terminal 102 is the physical position of the terminal 102, e.g., expressible using latitude and longitude. All positioning techniques have specific precision and accuracy, so the "position" of a device, as used herein, refers to a spatial area within which the terminal 102 is determined to be present, e.g., 42° N, 42° E±15 m for an example position determined using the Global Positioning System (GPS). "Position information" is a representation of position, e.g., in decimal or hour-minute-second degrees of a region in which the terminal 102 is determined to be present, e.g., identified using the centroid, corner(s), or other features of that region. Position data can additionally or alternatively include street addresses, building numbers, or other non-coordinate indications of a position of terminal 102.

As used herein, "location information" is any information used or useful in determining position of terminal 102. Location information can include position information. For example, terminal 102 can determine its position via GPS, and provide coordinates of the determined position as or in location information, e.g., included in a SIP REGISTER request. Additionally or alternatively, location information can include information that is not position information, but that can be used in determining or estimating position. For example, location information can include an EUTRAN Cell Global Identification (ECGI) of an eNodeB to which terminal 102 is, or has recently been, connected. Since an eNodeB has a limited spatial range, an ECGI indicates an area (eNodeB coverage area) in which the terminal 102 is (or recently was) positioned.

In some examples, core network device 108 or a terminal 102 or 104 can be configured to communicate with an information server 118. Information server 118 can be or include an authorization or authentication server, e.g., a home location register (HLR)/home subscriber server (HSS). Information server 118 can additionally or alternatively be or include a presence server, e.g., a SIP for Instant Messaging and Presence Leveraging Extensions (SIMPLE) or Open Mobile Alliance (OMA) presence server. Core network device 108 can communicate with information server 118, e.g., via the SIP or Diameter protocols or other protocols, e.g., over the LTE Sh interface or other appropriate interfaces.

In some examples, terminal 102 can transmit a first initialization message 120, e.g., a SIP REGISTER or SUBSCRIBE request, to core network device 108. As used herein, a message "transmitted to" or "transmitted toward" a destination, or similar terms, can be transmitted directly to the destination, or can be transmitted via one or more intermediate network devices to the destination. In the illustrated example, terminal 104 transmits first initialization message 120 to information server 118 via access network 112. Similarly, a message "received from" a destination can be received directly from the destination, or can be received via one or more intermediate network devices from the destination. In the illustrated example, information server 118 receives first initialization message 120 from terminal 104 via access network 112. A message passing through one or more intermediate network devices can be modified by those network devices, e.g., by adding or removing framing, or by changing a presentation of at least part of the message, e.g., from a SIP start-line to a SIP header or vice versa.

Terminal 102 can be an example of a watcher. In response, information server 118 can notify terminal 102 or core network device 108 when particular events occur, those events being defined within an "event package." In some examples, terminal 104 can transmit a publication message, e.g., a SIP PUBLISH request, to information server 118. The publication message can convey information about a state of terminal 104, e.g., with respect to events defined in an event package. A publication message, for example, can convey presence information or other information relating to, e.g., presence, handset capabilities, supported codecs, or handset location. In response to a publication message, information server 118 can convey updated information to watchers, e.g., terminal 102, by sending notification messages, e.g., SIP NOTIFY requests, to those devices. Using the SUBSCRIBE/PUBLISH/NOTIFY model, e.g., as in SIP, can permit terminal 102 to pull, or receive via push notifications such as a SIP NOTIFY request, information defined in a particular event package. In some examples such as those described herein with reference to FIGS. 2 and 3, terminal 102 watches a "reg" event package informing terminal 102 about its own state of registration with the core network.

In some examples, the first initialization message 120 may not succeed. For example, terminal 102 may send a REGISTER or SUBSCRIBE first initialization message 120.

Core network device 108 may determine, using request processing 122, that location information of the terminal 102 is required (e.g., for E911) but not available to the core network device 108. The core network device 108 may then respond to the first initialization message 120 with an initialization-failure message 124, e.g., a SIP 403 Forbidden response. Request processing 122 at core network device 108 is described herein with reference to FIGS. 2 and 3.

In some examples, terminal 102 may, using request processing 126, interact with a user of terminal 102, or adjust settings of terminal 102, in response to initialization-failure message 124. Terminal 102 may then send a second initialization message 128, e.g., including location information 130. Second initialization message 128 can include some data copied from or corresponding to first initialization message 120, or can be a new request not overlapping in data with first initialization message 120. For example, second initialization message 128 can be or include a SIP REGISTER request. Location information 130 can be or include, e.g., a Presence Information Data Format (PIDF) body such as a PIDF Location Object (PIDF-LO) (RFC 4119, RFC 5491). Request processing 126 at terminal 102, 104 is described herein with reference to FIGS. 2-9.

By including location information 130 in second initialization message 128, terminal 102 can reduce network bandwidth consumption in the carrier network by increasing the likelihood that the revise request 128 will succeed. In some examples, terminal 102 does not retry the first initialization message 120 unchanged. This can reduce bandwidth usage and increase terminal 102 battery life in situations in which an initialization failure is unlikely to be cured without action from terminal 102, e.g., where the carrier cannot ascertain a 911 location for the subscriber of the terminal.

In some examples, request processing 126 at terminal 102 involves communication only with core network device 108. Additionally or alternatively, request processing 126 can involve communication with at least one of core network device 108 or information server 118.

The terminal 102 in this example is a session-originating device, i.e., a terminal initiating a communication session with another terminal. Session-originating devices can include user equipment or other telecommunications or terminals communicatively connectable with other terminals via one or more core network device(s) 108. Mobile phones and copper-loop landline phones can be examples of session-originating devices.

Call initiation can be performed, e.g., as defined in the Global System for Mobile Communications (GSM) or VoLTE standards, and can include the exchange of additional messages (not shown) between the terminals 104 and 102 and the core network device(s) 108. For example, the user of terminal 102 can receive a user request to initiate a session, e.g., via a "Send" control 132 of a user interface. Terminal 102 can then transmit an initiation request of an SMS communication session, e.g., a SIP INVITE or a mobile originating forward short message (MO FSM), via, e.g., signaling path 114. Terminal 104 can receive the initiation request and present an alerting indication via a user interface. Terminal 104 can receive a user command to answer the call via a call-acceptance control 134 such as a touchscreen button. Terminal 104 can then transmit a SIP 200 OK response to a SIP INVITE message. Once the session is established, data of the session, such as audio data or video data, can be exchanged between terminals 104 and 102 via a communications channel depicted as media path 116. As shown, media path 116 can pass through core network device(s) 108 or can bypass core network device(s) 108.

Figure 2:
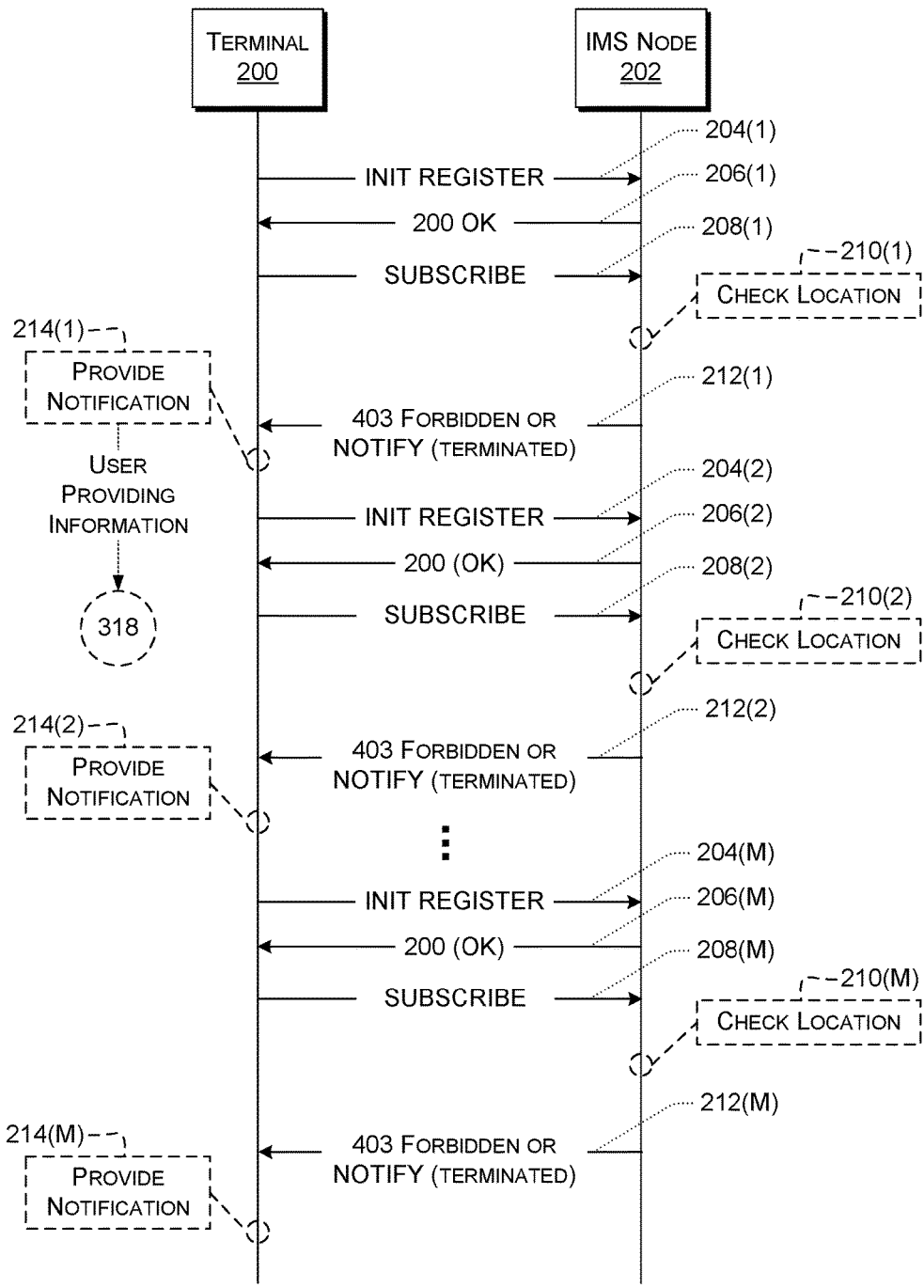
FIG. 2 is a diagram illustrating an example of signaling between a terminal and a network node when the terminal is unable to subscribe, e.g., for registration status.

FIG. 2 is a diagram illustrating example signaling between a terminal 200, which can represent terminal 102 or 104, and an IMS node 202, which can represent core network device 108. FIG. 2 illustrates a scenario where the terminal 200 encounters example issues during the terminal's 200 subscription for registration status. The example exchanges can be performed by or under control of request processing 122 at IMS node 202 and request processing 126 at terminal 200.

When the subscriber of the terminal 200 powers on the terminal 200, upon user request (e.g., via a user-interface control), when entering the range of a particular access network, or at other times (e.g., when the terminal 200 is taken out of airplane mode), the terminal 200 can perform various network initialization procedures. The procedures can include attempting to attach to an access network in order to transmit data to, and receive data from, the IMS core. To do this, the terminal 200 initiates registration by transmitting a first registration request 204(1) to the IMS node 202. In the case of access by the terminal 200 via a non-3GPP Radio Access Network (RAN), the first registration request 204(1) can be transmitted from the terminal 200, via the non-3GPP RAN (e.g., a WIFI AP and the Internet), to the IMS node 202.

In some examples, the first registration request 204(1) can comprise a SIP request using the SIP REGISTER method. FIG. 2 shows the first registration request 204(1) as an "INIT REGISTER" request to indicate that the registration status is initially designated as an initial registration status, prior to its designation as either an active registration status or a terminated registration status. The IMS node 202, upon receipt of the first registration request 204(1), can send a first registration response 206(1) comprising a 200 OK response to the terminal 200. The 200 OK response received by the terminal 200 indicates to the terminal 200 that the first registration request 204(1) was received by the IMS node 202. Other messages can be included but are omitted for brevity. For example, first registration request 204(1) can be an unprotected registration request transmitted from the terminal 200 to the IMS node 202. IMS node 202 can respond to the unprotected registration request with a 401 unauthorized (challenge request) response. Terminal 200 can respond to the challenge with a protected registration request. IMS node 202 can perform authentication and then transmit the 200 OK registration response 206(1). In another example, the terminal 200 may receive a registration error indication in the first registration response 206(1).

Continuing the depicted example, in response to receiving the first registration response 206(1) (comprising a 200 OK response) from the IMS node 202, the terminal 200 can then transmit a first subscription request 208(1) to the IMS node 202 in order to subscribe for notification of the terminal's 200 registration status. The first subscription request 208(1) can comprise a SIP request using the SUBSCRIBE method. The SUBSCRIBE method is generally used to initiate a subscription for notification of events; in this case, the subscription is for notification of the terminal's 200 registration status (i.e., the "reg" event package).

In some examples, at block 210(1), after receiving the first subscription request 208(1), the IMS node 202 can check availability or validity of location information associated with terminal 200. In some examples, block 210(1) can be performed at other times, e.g., between receiving the first registration request 204(1) and transmitting the first registration response 206(1). Block 210(1) can represent at least a portion of request processing 122.

At block 210(1), the IMS node 202 can retrieve, or attempt to retrieve, location information from at least one source. Sources can include at least one of: first registration request 204(1); first subscription request 208(1); terminal 200; a record associated with terminal 200 in an information server 118 (e.g., an HSS/HLR); or a computer-readable memory of or associated with the IMS node 202. Example records can include E911 records; Presence Information Data Format Location Object (PIDF-LO) records (RFC 4119, 5491); P-LANI (last-known cell location) records including, e.g., CGI or ECGI information such as an ECGI of a recently-connected eNodeB.

In some examples, e.g. in the absence of location information from the terminal 200 or access network 110, core network device 108 can be configured to access location information from an HLR/HSS or other information server 118 based on, e.g., the IMSI, IMEI, or telephone number of terminal 200, or other information provided, e.g., in first registration request 204(1) or first subscription request 208(1). However, some prepaid mobile phones and other prepaid terminals 200 do not include location information (e.g., physical-address information) in the subscriber profile stored in the HLR/HSS. Therefore, if the terminal 200 does not provide usable location information, and the access network 110 does not provide usable location information, and the subscriber profile does not include usable location information, the core network device 108 can determine that the location is unknown.

In some examples, the IMS node can determine location information comprising an error indication if none of the sources, or particular source(s), are unable to provide location information. For example, the HSS/HLR may not have location data for a terminal 200 that is attaching via a non-3GPP access and that has not attached via a 3GPP access within a validity period (e.g., four hours, or another number of hours, minutes, or seconds, before the time of attach).

At block 210(1), the IMS node 202 can test the location information against at least one criterion. After testing the location information, the IMS node 202 can transmit a first subscription response 212(1) to the terminal 200. If the location information does not conform with the at least one criterion, or with a predetermined percentage or set of one or more predetermined criteria, the first subscription response 212(1) can either (i) reject the first subscription request 208(1), or (ii) notify the terminal 200 of a terminated registration status. Example criteria can include: that location information was retrieved (e.g., from any source, or from a particular source), or that the location information carries a timestamp within a validity period.

In scenario (i) above, the first subscription response 212(1) can include a SIP response specifying a type of error in a first error category (e.g., a first error category comprising a 403 forbidden error). In scenario (ii) above, the IMS node 202 may first transmit a SIP response comprising a 200 OK response to the first subscription request 208(1). The IMS node 202 can then transmit the first subscription response 212(1) comprising a SIP NOTIFY request to the terminal 200 specifying a terminated registration status. In this way, if the IMS node 202 has missing, expired, incomplete, or invalid location information, the IMS node 202 can inform the terminal 200. Various examples of failures to determine location are discussed below.

In some examples of scenario (i) above, the first subscription response 212(1) can reject the first subscription request 208(1) by specifying a type of error in a second error category. A second error category can include, e.g., a 504 error type with a message body containing "initial registration" and a transaction timeout (Timer F expired) pursuant to 3GPP 24.229 5.1.2A.1.6, or a second error category comprising a 408 or 504 error type with no message body). In some examples, in response to a type of error in a second error category, terminal 200 can wait for an amount of time determined based at least in part on a Retry-After header in the first subscription response 212(1) (or in a Retry-After header field of a different response that is transmitted before or after the first subscription response 212(1)) before transmitting the second registration request 204(2).

In some examples of scenario (i) above, first subscription response 212(1) can reject the first subscription request 208(1) by specifying a type of error in a third error category. A third error category can include, e.g., a 3xx, 4xx, 5xx, or 6xx error type, with the exception of a particular subset of 4xx error types, including at least 401, 403, 408, 421, 422, and 423 error types, and also with the exception of a particular subset of 5xx error types, including at least a 504 error type with, or without, a message body containing "initial registration.". In other words, the third error category can include types of subscription errors other than 401, 403, 408, 421, 422, 423, and 504 error types, wherein the 401, 403, 408, 421, 422, 423, and 504 error types can be considered to be in a different error category than the third error category. In response to encountering an error in the third error category in the first subscription response 212(1), the terminal 200 can transmit a second subscription request 208(2) to the IMS node 202, bypassing second registration request 204(2) and second registration response 206(2).

It is to be appreciated that the first, second, and third error categories described herein can be implemented with different error types in each category. This is due to possible differences in network configuration from one provider to another and the different uses for different error types. For example, in some configurations, the third error category may include some or all of the error types listed in the exception list; that is, the third error category may include, for instance, the 401, 403, 408, and 504 (and possibly other) error types rather than excluding them. Likewise, the second error category may include the 401 and 403 error types in addition to those mentioned above as being included in the second error category.

In some examples, terminal 200 can fail to provide location information (e.g., position information or other location information), e.g., in first registration request 204(1) or first subscription request 208(1). For example, terminal 200 can be an inexpensive feature phone that does not include a receiver for GPS or other radionavigation signals and so cannot provide coordinates. Additionally or alternatively, terminal 200 can be attaching using a SIM card that does not have stored location information (e.g., the user's home or other registered address).

In some examples, terminal 200 can provide expired location information. For example, the terminal can provide an ECGI more than two hours old, e.g., if the terminal 200 has been out of cellular range for more than two hours (such as while in an aircraft on a flight longer than two hours).

In some examples, terminal 200 can provide location information that is inaccurate or that cannot be verified. For example, some mobile phones that are not standards-compliant transmit timestamps in local time with no time-zone information, instead of in UTC or with time-zone information. As a result, some core network devices cannot verify whether the location information provided by such mobile phones is sufficiently current to meet legislative or regulatory mandates related to the provision of emergency services (e.g., 911 service). In some examples, regulations may require that position or location information be at most two hours old. However, in time zones UTC+3-UTC+14 (or UTC+(≥3)), if local time is transmitted without a time-zone offset, the timestamp may be considered to be UTC, but three or more hours old (e.g., at 8:00 UTC, UTC+3 is 11:00, or three hours later). This may result in timestamped location data being considered too old for use, e.g., more than two hours old.

In some examples, terminal 200 can provide invalid location information. For example, the terminal 200 can provide a dummy or constant ECGI value rather than an ECGI value of an actual eNodeB within range of the terminal 200. Additionally or alternatively, the terminal 200 can transmit blank or mis-formatted location information, e.g., due to software bugs.

In some examples, the terminal 200 can provide location information that is not usable by core network device 108. For example, a cellular phone roaming in a visited operator's network can provide the visited ECGI to a home operator's S-CSCF (core network device 108). However, the home operator may not have the necessary information to determine a position from that ECGI, since the home operator may not have access to the visited operator's cell-coverage databases.

In some examples, terminal 200 is connected to network 106 via a WIFI access network 110 or other location-agnostic access network. In some of these examples, the access network 110 does not provide location information for terminal 200. As used herein, a "location-agnostic" access network is an access network that does not, as part of the normal operation of the access network, provide location information for devices connected to that network. Examples of location-agnostic access networks can include WIFI networks or other IEEE-standardized wireless networks; or Ethernet or other wired networks. Location-agnostic networks can be, e.g., used to establish connections to core network devices via public data network connections such as the Internet, or via an LTE Evolved Packet Data Gateway (ePDG).

In some examples, access devices for location-agnostic networks, e.g., WIFI access points (APs), do not store position information for themselves or for connected users, so cannot provide position information. Moreover, the ePDG or network devices such as firewalls or routers may frame, tunnel, or otherwise modify the packets from an access device, preventing using Internet Protocol (IP)-address geolocation to determine location information. By contrast, access devices for a 3GPP access or other location-aware access network, such as eNodeBs in the EUTRAN, can provide position or other location information, e.g., Location Area Identification (LAI), EUTRAN Cell Identity (ECI), or ECGI values, to core network device 108. LAI values can include an MCC, an MNC, and a Location Area Code (LAC). In some examples, a location-aware access network can provide coordinates of the terminal.

In some examples, terminal 200, e.g., when connected via a location-agnostic access network, can provide, e.g., in first registration request 204(1) or first subscription request 208(1), identification or location information of the last location-aware access device to which terminal 200 was connected. For example, terminal 200 can provide the ECGI of the last eNodeB to which terminal 200 was connected, together with a timestamp indicating when the terminal 200 was last connected to that eNodeB. However, the timestamp may be incorrect, lacking time-zone information, or the location information may be older than a predetermined time period. For example, a regulatory requirement that location information be newer than two hours old would prevent using the last-connected ECGI if the timestamp indicates a time more than two hours in the past. Therefore, even if terminal 200 provides information of a last-connected access device, it may not be possible or practical for the core network devices 108, or the information server 118, to rely on that information in determining a location of the terminal 200.

Above are given various examples in which the terminal 200 may not provide usable location information, in which the access network 110 does not provide usable location information, or in which the subscriber profile does not include usable location information. The above examples are nonlimiting. As used herein, the location being "unknown" means that location information is absent, too old, out of compliance with technical, statutory, or regulatory requirements, or otherwise not usable. Various aspects herein can operate whenever the location is unknown (e.g., usable location information is absent), e.g., due to any of the above-listed reasons; bugs or software failure of network component(s); cosmic-ray-induced data corruption; malicious activity; or any other cause.

Still referring to FIG. 2, in the illustrated example, at block 210(1), IMS node 202 determines that the location of the terminal 200 is unknown, and that the requested subscription is not available in the absence of location information. IMS node 202 thus transmits first subscription response 212(1) to terminal 200.

In some examples, at block 214(1) (or any block 214(i), 1≤i≤M, and likewise throughout), terminal 200, in response to the first subscription response 212(1), can provide a notification, e.g., to the user of terminal 200. The notification can include a visual, auditory, haptic (e.g., vibration), or other-modality notification. Examples of visual notifications include toast notifications or other popups presented on a visual display of terminal 200. The popup can indicate the failure, so that the user knows the status of the pertinent network service.

In some examples, the notification can prompt the user to take action based on the failure. For example, if location data are missing, the popup can ask the user of terminal 200 to provide the location data (e.g., an address of the user's location), as discussed herein with reference to block 320. If the user provides the information, processing can resume with block 318, FIG. 3.

In some examples, at block 214(1), terminal 200 can determine that the first subscription response 212(1) indicates that one or more criteria have not been satisfied, e.g., because location information is missing. Terminal 200 can then determine content of the notification based at least in part on the criterion or criteria that have not been satisfied. For example, if the first subscription response 212(1) indicates that the location is unknown, terminal 200 can present a notification such as "Turn on location to connect to WIFI calling."

After receiving first subscription response 212(1), or after providing the notification at block 214(1), the terminal 200 can transmit a second registration request 204(2) to the IMS node 202. In some examples, the terminal 200 can wait for a first time period before transmitting the second registration request 204(2). Waiting can give components of the carrier network time to recover from an issue that may be resolved with time, such as high network congestion. Examples of second registration request 204(2) are discussed herein, e.g., with reference to first registration request 204(1). For brevity, throughout the remainder of this document, contents of, and techniques for sending or receiving, message nnn(i) are also applicable to messages nnn(j), j≠i, unless otherwise specified.

In response to the second registration request 204(2), the terminal 200 may receive a second registration response 206(2) from the IMS node 202. The second registration response 206(2) can comprise another 200 OK response, as shown in FIG. 2. The terminal 200 may then transmit a second subscription request 208(2) to the IMS node 202.

In some examples, at block 210(2), after receiving the second subscription request 208(2), the IMS node 202 can check availability or validity of location information associated with terminal 200. Examples are discussed herein, e.g., with reference to block 210(1). IMS node 202 can respond to terminal 200 with a second subscription response 212(2) that either (i) rejects the second subscription request 208(2) by specifying a type of error in the first error category (e.g., a first error category comprising a 403 forbidden error), or (ii) notifies the terminal 200 of a terminated registration status.

In some examples, at block 214(2), in response to receipt of the second subscription response 212(2) where the terminal 200 encounters issues such as those noted above, the terminal 200 can provide another notification. Examples are discussed herein, e.g., with reference to block 214(1). Providing another notification can give the user of terminal 200 another opportunity to take corrective action, e.g., if the user did not notice the notification provided at block 214(1).

A group including messages identified as 204, 206, 208, and 212, and blocks identified as 210 and 214, can be repeated any number of times. In some examples, the group is repeated at most M times (integer M≥2). In some examples, repetition of the groups is terminated, e.g., when terminal 200 is powered down or reset, or when terminal 200 enters the range of an alternative access network. For example, terminal 200 can desist attempting to register for WFC when in range of a cellular network, in some examples.

In some examples, at least one of the groups can include waiting for an ith time period (integer 1≤i≤M) after receiving a subscription response 212(i) or providing a notification at block 214(i), and before providing an ith registration request 204(i). In some examples, each time period can have the same length as the other time periods, e.g., a predetermined time period stored in a configuration memory. In some examples, at least two of the time periods can differ from each other in duration. For example, successive time periods can be extended, e.g., via linear or exponential backoff. In some examples, extension of the time periods can be capped, e.g., at a predetermined longest duration of one of the time periods.

FIG. 2 illustrates examples in which terminal 200 stops (or refrain from) transmitting any additional registration requests 204 after the terminal 200 encounters the same (or a similar) issue or failure during subscription for registration status for an $M^{th}$ time. This can reduce the use of network bandwidth attempting to proceed in the face of an issue that is unlikely to resolve itself with more time. Halting the transmission of additional registration requests 204 after transmitting a predetermined number M of registration requests 204 may be useful in a situation, e.g., where the 911 location for the subscriber of the terminal 200 cannot be ascertained by the carrier. This issue would not resolve itself with more time, and therefore, it makes sense to stop attempting registration if the 911 location is unlikely to be ascertained. Providing notifications at blocks 214(1)-214(M) permits the user to rectify the situation, but that may take a significant amount of time, during which further registration requests 204 would waste bandwidth.

Figure 3:
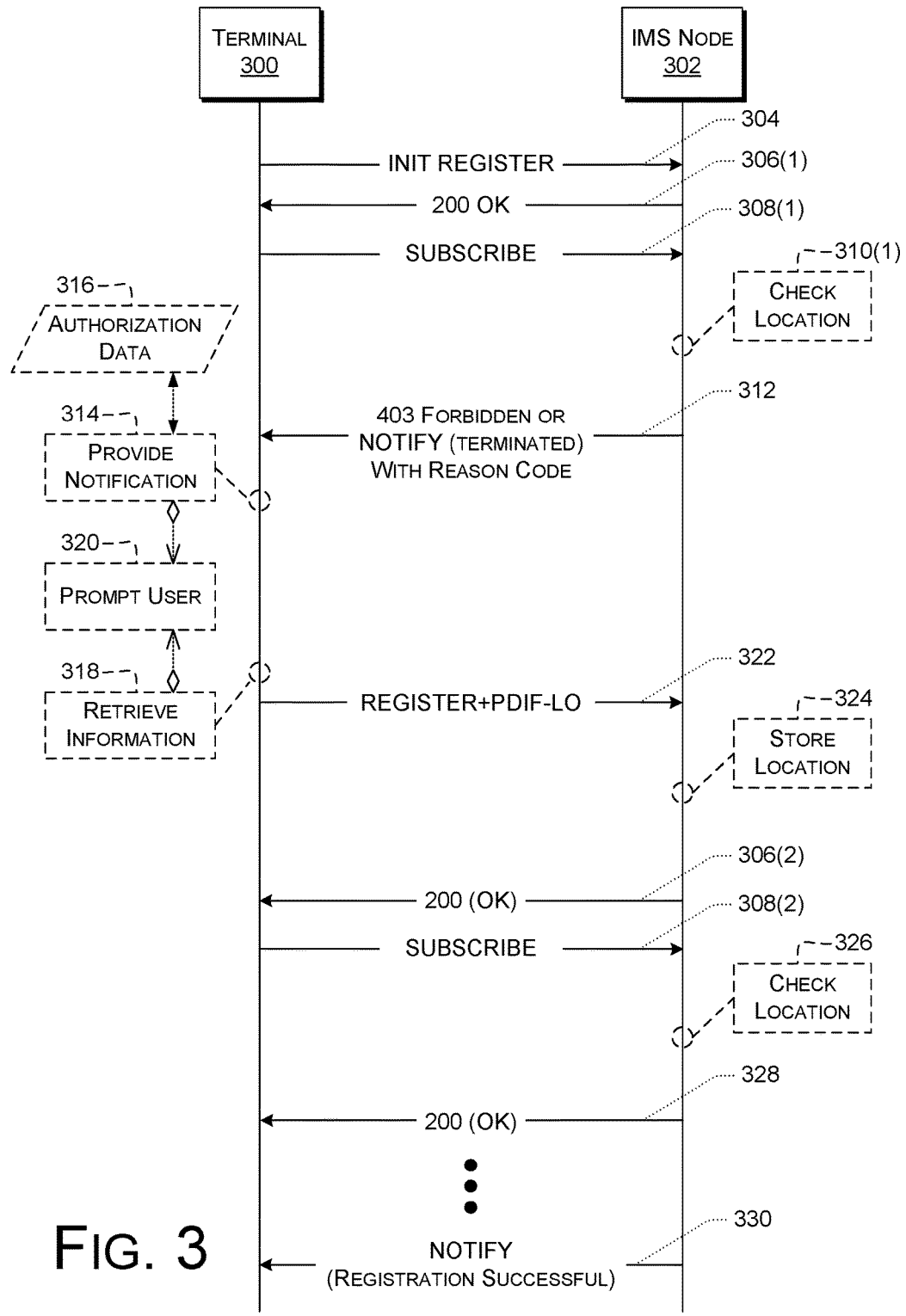
FIG. 3 is a diagram illustrating an example of signaling between a terminal and a network node when the terminal is unable to subscribe, and example mitigation techniques at the terminal and the network node.

FIG. 3 is a diagram illustrating example signaling between a terminal 300, which can represent terminal 102 or 104, and an IMS node 302, which can represent core network device 108. FIG. 3 illustrates a scenario where the terminal 300 encounters example issues during the terminal's 300 subscription for registration status. The example exchanges can be performed by or under control of request processing 122 at IMS node 302 and request processing 126 at terminal 300. The illustrated signaling can be performed at the time of network initialization, e.g., as discussed herein with reference to FIG. 3.

In the illustrated example, the terminal 300 initiates registration by transmitting a first registration request 304 to the IMS node 302, e.g., via a non-3GPP RAN. Examples are discussed herein, e.g., with reference to first registration request 204(1).

Continuing the depicted example, in response to receiving the first registration response 306(1) (comprising a 200 OK response) from the IMS node 302, the terminal 300 can then transmit a first subscription request 308(1) to the IMS node 302 in order to subscribe for notification of the terminal's 300 registration status. Examples are discussed herein, e.g., with reference to first registration response 206(1) and first subscription request 208(1).

In some examples, at block 310(1), after receiving the first subscription request 308(1), the IMS node 302 can check availability or validity of location information associated with terminal 300. Examples are discussed herein, e.g., with reference to block 210(1). In some examples, block 310(1) can be performed at other times, e.g., between receiving the first registration request 304 and transmitting the first registration response 306(1). Block 310(1) can represent at least a portion of request processing 122.

At block 310(1), the IMS node 302 can test the location information against at least one criterion. After testing the location information, the IMS node 302 can transmit a first subscription response 312 to the terminal 300. Examples are discussed herein, e.g., with reference to first subscription response 212(1). First subscription response 312 can include a "reason code" or other reason data, e.g., a header, body portion, status code, or other value indicating why the subscription failed. For example, the reason code can indicate that subscription was unsuccessful because location information (e.g., an E911 address) was not available or was not valid. Examples of testing criteria, e.g., testing for valid location information, are described herein with reference to block 210(1).

In some examples, at block 314, terminal 300, in response to the first subscription response 312, can provide a notification, e.g., to the user of terminal 300. Examples of notification modalities are described herein with reference to block 214(1). In some examples, terminal 200 can determine that the first subscription response 312 indicates that one or more criteria have not been satisfied, e.g., because location information is missing. Terminal 200 can then determine content of the notification based at least in part on (1) the criterion or criteria that have not been satisfied; and (2) stored authorization data 316. Authorization data 316 can be stored locally by terminal 300, or remotely, e.g., in an information server 118 such as an HSS/HLR or a customer database server.

Authorization data 316 can include, e.g., user-preference data, or permission data. Authorization data 316 can be received directly from a user, and stored, by terminal 300. For example, terminal 300 can receive the authorization data 316 via a "Settings" or "Permissions" user interface. Additionally or alternatively, authorization data 316 can be received from an information server 118, e.g., a customer database. In some examples, the authorization data 316 are populated in the customer database at the time a customer signs up with a carrier, e.g., in response to customer acceptance of the carrier's terms of service.

Some examples permit registering or subscribing even when location or other information is initially unavailable, as follows. The first subscription response 312 can indicate that the location is unknown. The authorization data 316 can indicate that the terminal is permitted to retrieve this missing information for the purpose of registering or subscribing. At block 314, terminal 300 can present a notification indicating that the information will be retrieved. For example, when location information is missing, terminal 300 can present a notification such as "Turning on location to connect to WIFI Calling."

Terminal 300 can additionally or alternatively present, within or in addition to the notification, an explanatory message, a "details" link or popup providing access to the explanatory message, or other information. For example, the explanatory message can indicate that "Turning on location will not impact user privacy. Location setting will not change for other applications. Location is needed only to connect to WIFI Calling." Additionally or alternatively, the explanatory message can indicate that "Location will be turned off once WIFI Calling is active."

In some examples, at block 314, terminal 300 can request authorization data 316. For example, the notification can read "Turning on location to connect to WIFI Calling. Please select 'Yes' to continue." If the user selects "Yes," processing can continue with block 318, below. Additionally or alternatively, if the user selects "Yes," terminal 300 can update authorization data 316 to indicate that user permission has been granted. If the user does not select "Yes," processing can terminate, or can resume with second registration request 204(2), FIG. 2. In some examples, the notification can provide the user with more than a yes/no choice, e.g., options "Enable location for all apps," "Enable location only to register with WIFI Calling," and "Do not enable location (WIFI Calling unavailable)." Terminal 300 can then receive the user's choice and, in response, update location information 130 or, if authorized, perform block 318.

In some examples, authorization data 316 can indicate pre-authorization to retrieve the required information. For example, authorization data 316 can authorize terminal 300 to determine location information autonomously in order to permit WIFI Calling. In some of these examples, block 314 can be bypassed. Instead, terminal 300 can respond to first subscription response 312 by performing block 318.

In some examples, at block 318, terminal 300 can retrieve the missing information indicated by the reason code in first subscription response 312. In some examples in which location information is missing, terminal 300 can enable location services (for all apps or only for WFC registration), determine a location of terminal 300 (e.g., via GPS or via access-point triangulation), disable location services (e.g., for all apps, or only for those apps for which location services were enabled in block 318), and determine the location information indicating the determined location of the terminal 300. For example, terminal 300 can determine a PIDF-LO record storing the determined location. Additionally or alternatively, terminal 300 can determine data representing the determined location in XML, JSON, RFC 822, or other formats.

In some examples in which block 318 includes enabling location services (e.g., in response to user approval via a notification), location can be turned on for some or all apps installed on terminal 300. In some of these examples, the user can disable location manually after WFC registration.

In other examples in which block 318 includes enabling location services, location services are enabled only for WFC registration, and user settings for apps using location services are not affected. In some of these examples, location services are automatically disabled for some or all apps once the location has been determined.

In some examples, at block 320, terminal 300 can prompt the user for, and then receive from the user, missing information. For example, terminal 320 can present a dialog box or play an auditory prompt. Block 320 can additionally or alternatively be used as part of, or in connection with, block 314.

As noted above with reference to block 214(1), in some examples, the notification may prompt the user for missing information, e.g., missing location information. In some of these examples, block 214(1) can be followed by block 318 or block 320. At block 318, terminal 300 can assemble the required information from the user's responses. For example, terminal 300 can retrieve the missing information from data of or representing the user's response (e.g., captured text-entry data, OCRed pen data, or output of a speech recognizer operating on user-provided audio data). Terminal 300 can additionally or alternatively update authorization data 316, information server 118, or another information repository to include the user-entered information.

During or after processing at block 318, once the required information is available, terminal 300 can transmit a second registration request 322 to the IMS node 302. The second registration request 322 can include the missing information, or can otherwise cure a deficiency or deficiencies identified by the reason code in first subscription response 312. In the illustrated example, the second registration request 322 includes or is accompanied by location information in the PIDF-LO format. Other formats can additionally or alternatively be used, as noted above.

In some examples, at block 324, IMS node 302 can store the location information or other information that was included in second registration request 322. For example, IMS node 302 can store the information locally, or can update an HSS/HLR or other information server with the information, e.g., using a Diameter Update Location Request (ULR) or Insert subscriber Data Request (IDR). IMS node 302 can then respond to the second registration request 322 with second registration response 306(2). In some examples, second registration response 306(2) can be sent before, during, or after the storage of the information.

After receiving second registration response 306(2), terminal 300 can transmit second subscription request 308(2). Examples are discussed herein, e.g., with reference to second subscription request 208(2).

In some examples, at block 326, IMS node 302 can check the location information (or other information) in second subscription request 322. IMS node 302 can test the at least one criterion against: location information or other information found in second registration request 322; information stored at block 324; or a combination of at least part of each of those. IMS node 302 can determine that the tested information satisfies the at least one criterion, e.g., as discussed herein with reference to block 210(1). IMS node can then transmit second registration response 328, e.g., a 200 OK response. Subsequently, e.g., substantially immediately, or after completion of other registration processing, IMS node 302 can transmit a notification message 330, e.g., a SIP NOTIFY carrying a "reg" event indicating that the registration was successful. For example, the other registration processing can include core network device 108 performing authentication or authorization processing, e.g., including message exchanges with authorization functions of information server 118. In some examples, core network device 108 can communicate with an information server 118, e.g., an HSS, to validate the terminal 102.

Figure 4:
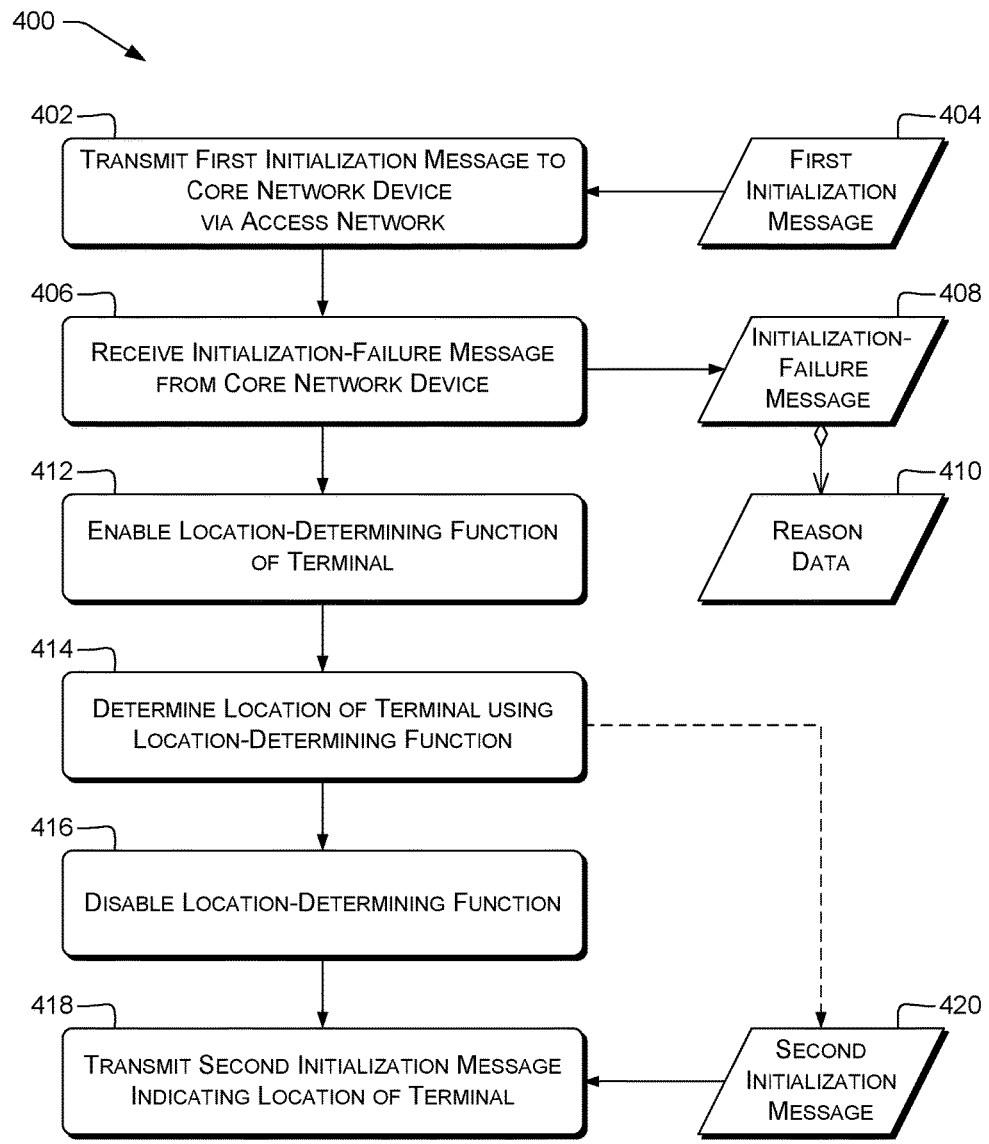
FIG. 4 is a dataflow diagram illustrating an example process for initializing communications with a core network device at a terminal according to some implementations.

FIG. 4 illustrates an example process 400 for responding to an initialization failure at a terminal, e.g., terminal 102 or 200, and associated data items. In some examples, the terminal 102 includes a control unit configured to perform operations described below, e.g., in response to computer-executable instructions or FPGA configuration data of the request processing 126. Example control units are described herein with reference to FIG. 10.

Operations shown in FIGS. 4-9 can be performed in any order except when otherwise specified, or when data from an earlier step is used in a later step. Any operation shown in multiple figures can be as discussed with reference to the first figure in which that operation is shown.

Figure 9:
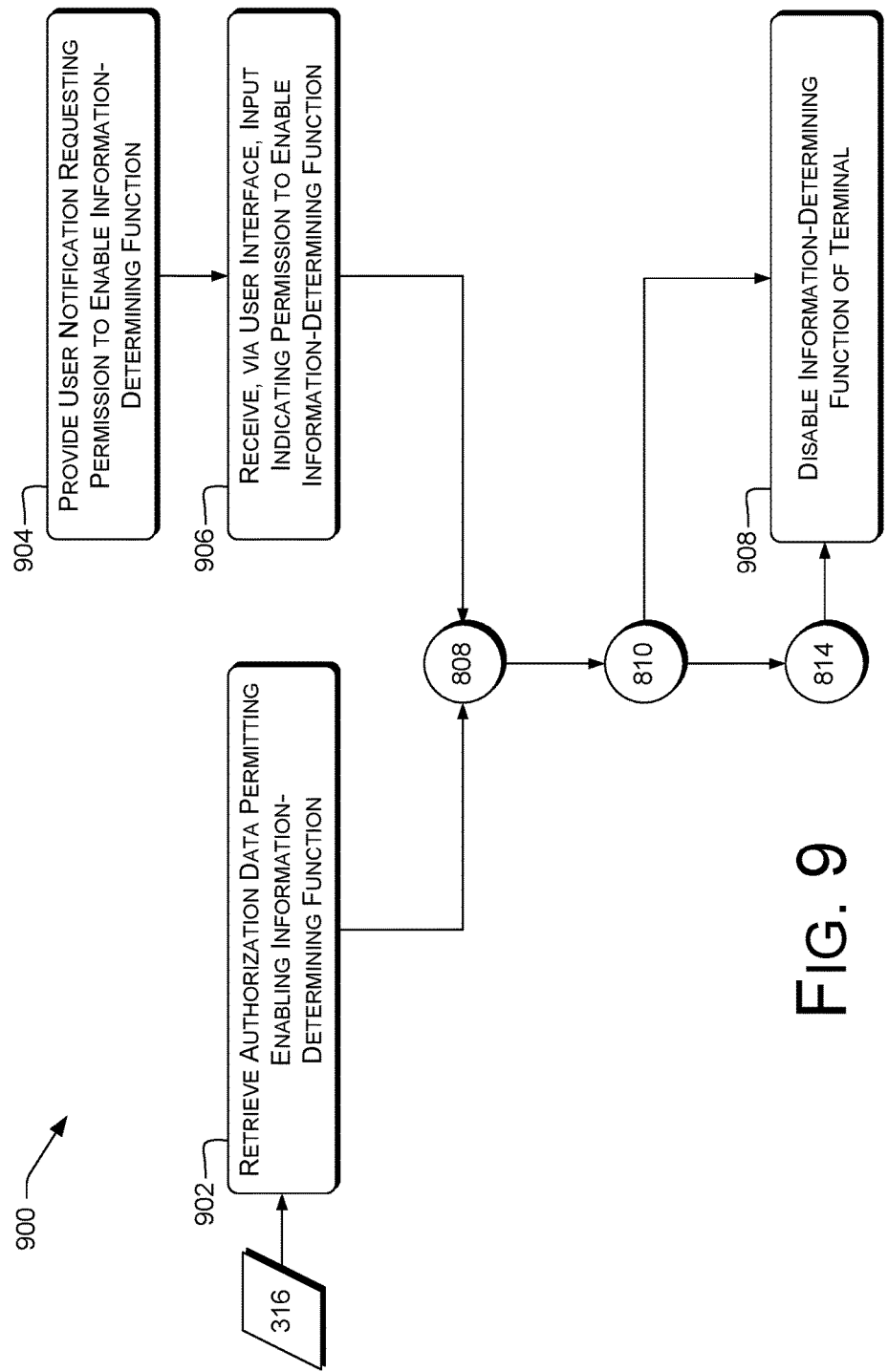
FIG. 9 is a dataflow diagram illustrating example processes for responding to an initialization failure at a terminal according to some implementations, including interacting with a user of the terminal or retrieving authorization data.
Figure 10:
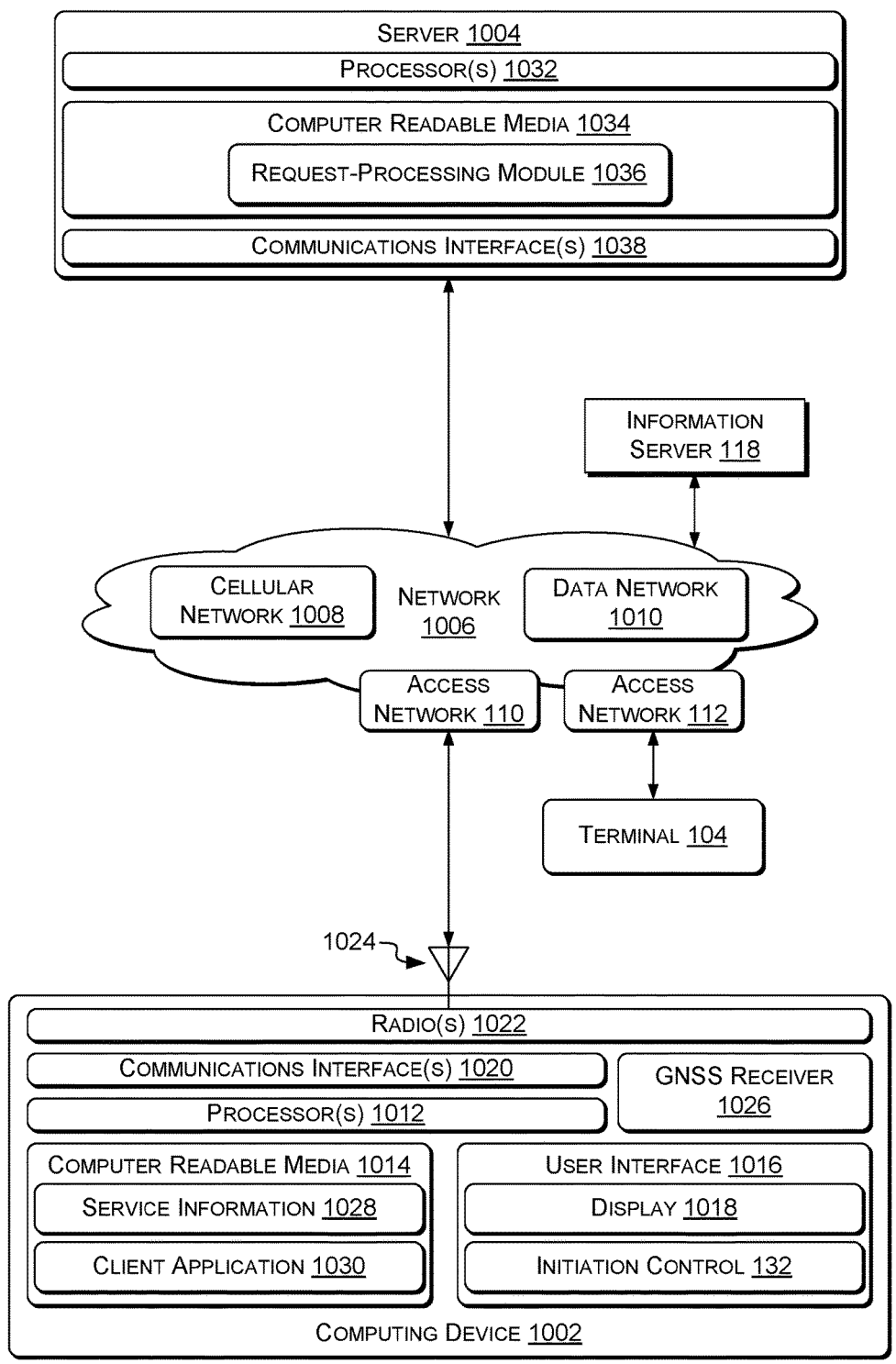
FIG. 10 is a block diagram illustrating components of a telecommunication system according to some implementations, and illustrating components of a terminal and a server of the telecommunication system.

For clarity of explanation, reference is made in the discussion of the flowcharts to various components shown in FIGS. 1 and 10, and messages shown in FIGS. 2 and 3, that can carry out or participate in the steps or operations of the exemplary method. It should be noted, however, that other components can be used; that is, exemplary method(s) shown in FIGS. 4-9 are not limited to being carried out by the identified components or using the identified messages.

In some examples, at block 402, the control unit can transmit, to a core network device 108 of the network via the access network 110, a first initialization message 404. The core network device can be or include, e.g., an IMS node 202 or 302. The first initialization message 404 can be or include, e.g., a SIP REGISTER or SUBSCRIBE request. Examples are discussed herein, e.g., with reference to first registration request 204, subscription requests 208(i), first registration request 304, or subscription requests 308(i).

In some examples, at block 406, the control unit can receive, from the core network device 108 via the communications interface, an initialization-failure message 408. Block 406 can be performed after block 402. The initialization-failure message 408 can indicate that the terminal 102 is not authorized to participate in network sessions when connected via the access network due at least partly to a lack, at the core network device, of valid location information of the terminal. Examples are discussed herein, e.g., with reference to subscription responses 212(i) and first subscription response 312. For example, the initialization-failure message can indicate that terminal 102 is successfully communicating with core network device 108, but that core network device 108 will not permit or assist terminal 102 to communicate with terminal 104. In some examples, block 406 can be followed by blocks 412-418. Blocks 412-416 can be part of block 318 of retrieving information.

In some examples, the initialization-failure message 408 comprises reason data 410 indicating the lack of the valid location information. The reason data 410 can include at least one of: a SIP response code (e.g., 403 or other 4xx or 5xx); or at least part of a SIP header (e.g., "X-Failure: e911-missing"). In some non-SIP examples, the reason data 410 or other portion of the initialization-failure message 408 can include an error code, response code, attribute-value pair (AVP), named header, or protocol-header value of another protocol (e.g., Point-to-Point Protocol, PPP). In some examples, the reason data 410 can be, include, or be included in, a PIDF-LO.

In some examples, at block 412, the control unit can enable a location-determining function of the terminal. The location-determining function can include hardware, firmware, or software components, in any combination. For example, the location-determining function can include computer-executable instructions that are executed only when an "enabled" flag in memory is set, and block 412 can include setting the "enabled" flag in the memory.

In some examples, at block 414, the control unit can determine a location of the terminal using the location-determining function. For example, the control unit can operate a GPS or other global navigation satellite system (GNSS) receiver to determine latitude and longitude. Additionally or alternatively, the control unit can perform position triangulation based on signals from multiple known-position transmitters, e.g., cell towers or broadcast stations. Additionally or alternatively, the control unit can request position information from a location resource function (LRF) or other device with which terminal 102 can communicate. For example, the control unit can read a 911 address from a SIM, request a 911 address from a core-network LRF, or retrieve P-LANI information from an HSS/HLR. Additionally or alternatively, the control unit can estimate its position by detecting a signature of its wireless environment and looking up the signature in a position database. A wireless-environment signature can include, e.g., the SSIDs of WIFI networks detectable by terminal 102 from its current location, or the frequencies of broadcast stations that terminal 102 is able to receive from its current location.

In some examples, at block 416, the control unit can disable the location-determining function, e.g., after block 414. For example, block 416 can include clearing an "enabled" flag in memory.

In some examples, at block 418, the control unit can transmit, to the core network device via the access network, a second initialization message 420 indicating the location of the terminal. Examples are discussed herein, e.g., with reference to second registration request 322. For example, the second initialization message can include a PIDF-LO record indicating the location of the terminal. Block 414 can provide the location information included in the second initialization message 420, as indicated by the dashed arrow.

Figure 5:
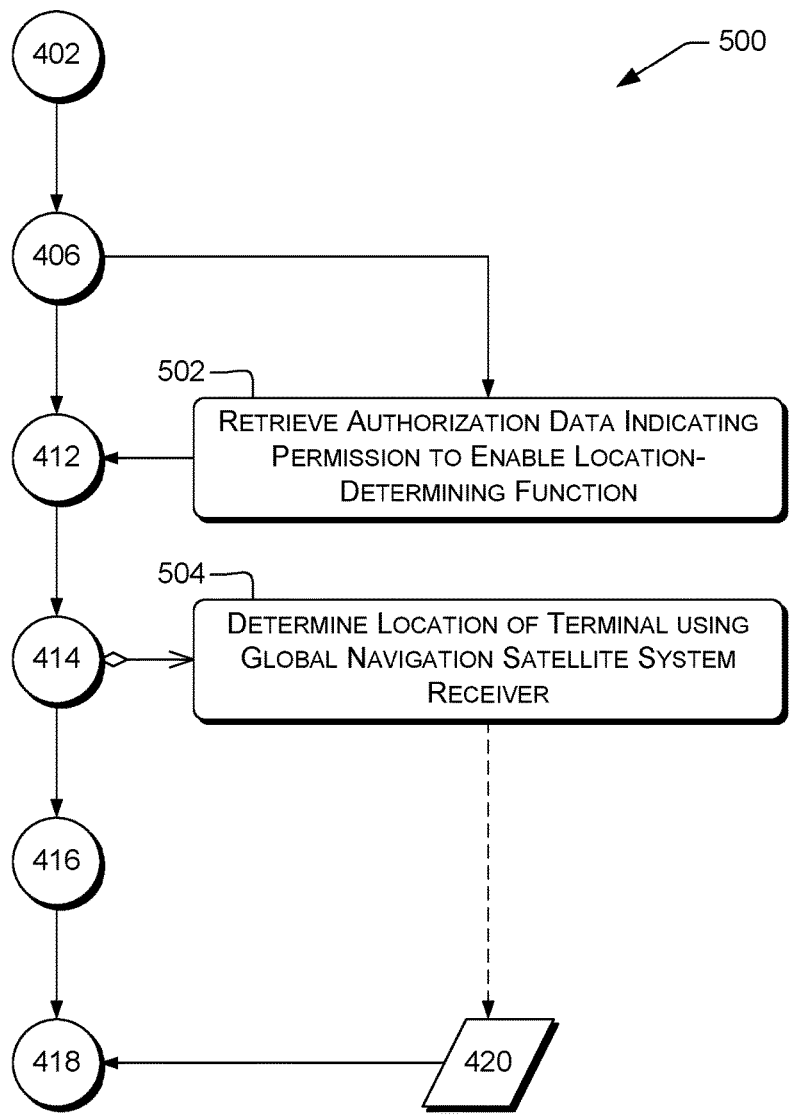
FIG. 5 is a dataflow diagram illustrating example processes for determining location in response to an initialization failure at a terminal according to some implementations.

FIG. 5 illustrates an example process 500 for responding to an initialization failure at terminal 102, and associated data items. In some examples, block 406 can be followed by block 502. In some examples, block 414 can include block 504.

In some examples, at block 502, the control unit can retrieve authorization data 316 indicating permission to enable the location-determining function. Block 502 can be performed before enabling the location-determining function at block 412. In some examples, performance of block 412 is conditioned on retrieval of the authorization data at block 502. Examples of authorization data are described herein with reference to FIG. 3, e.g., blocks 314 and 318. For example, the authorization data 316 can permit performing block 412 without user intervention, which can reduce the time required to set up WFC or other network services.

In some examples, at block 504, the control unit can determine the location using a GNSS receiver of the terminal 102. Operations of block 504 can be, include, or be included in second operations that the control unit is configured to perform only while the location-determining function is enabled.

Figure 6:
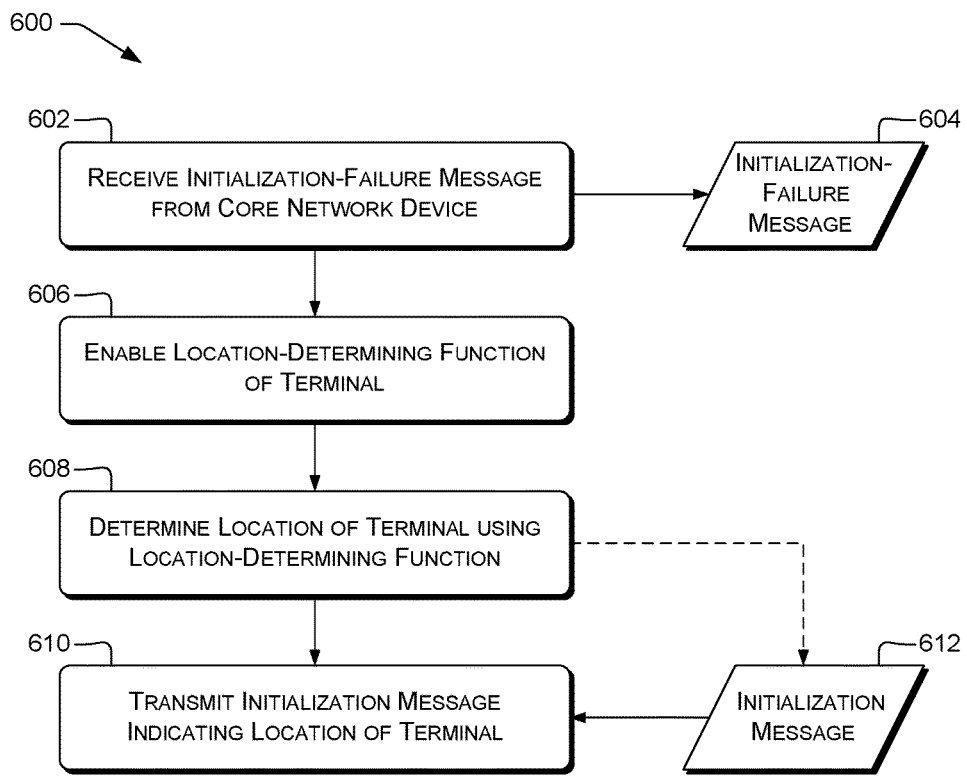
FIG. 6 is a dataflow diagram illustrating an example process for responding to an initialization failure at a terminal by determining location, according to some implementations.

FIG. 6 illustrates an example process 600 for responding to an initialization failure at a terminal 102 of a network, and associated data items. In some examples, the terminal 102 includes a control unit configured to perform operations described below. In some examples, the control unit performs blocks 602-608 in order as a first set of operations.

In some examples, at block 602, the control unit can receive, from a core network device, an initialization-failure message 604 indicating that the network terminal is not authorized to participate in network sessions due at least partly to a lack, at the core network device, of valid location information of the terminal. In some examples, the initialization-failure message comprises a SIP 403 response code. Examples are discussed herein, e.g., with reference to block 402 and initialization-failure message 408.

In some examples, at block 606, the control unit can enable a location-determining function of the terminal. Examples are discussed herein, e.g., with reference to block 412.

In some examples, at block 608, the control unit can determine a location of the terminal using the location-determining function. Examples are discussed herein, e.g., with reference to block 414.

In some examples, at block 610, the control unit can transmit, to the core network device, an initialization message 612 indicating the location of the terminal. In some examples, initialization message 612 can include at least one of a SIP REGISTER request or a SIP SUBSCRIBE request. In some examples, initialization message 612 can include a PIDF-LO record indicating the location of the terminal 102. Examples are discussed herein, e.g., with reference to block 418 and second initialization message 420.

Block 610 can be performed, e.g., after, or at least partly in parallel with, performing the first set of operations (blocks 602-608). For example, block 610 can be performed as soon as the location is determined in block 608, even if block 608 is not yet fully complete.

Figure 7:
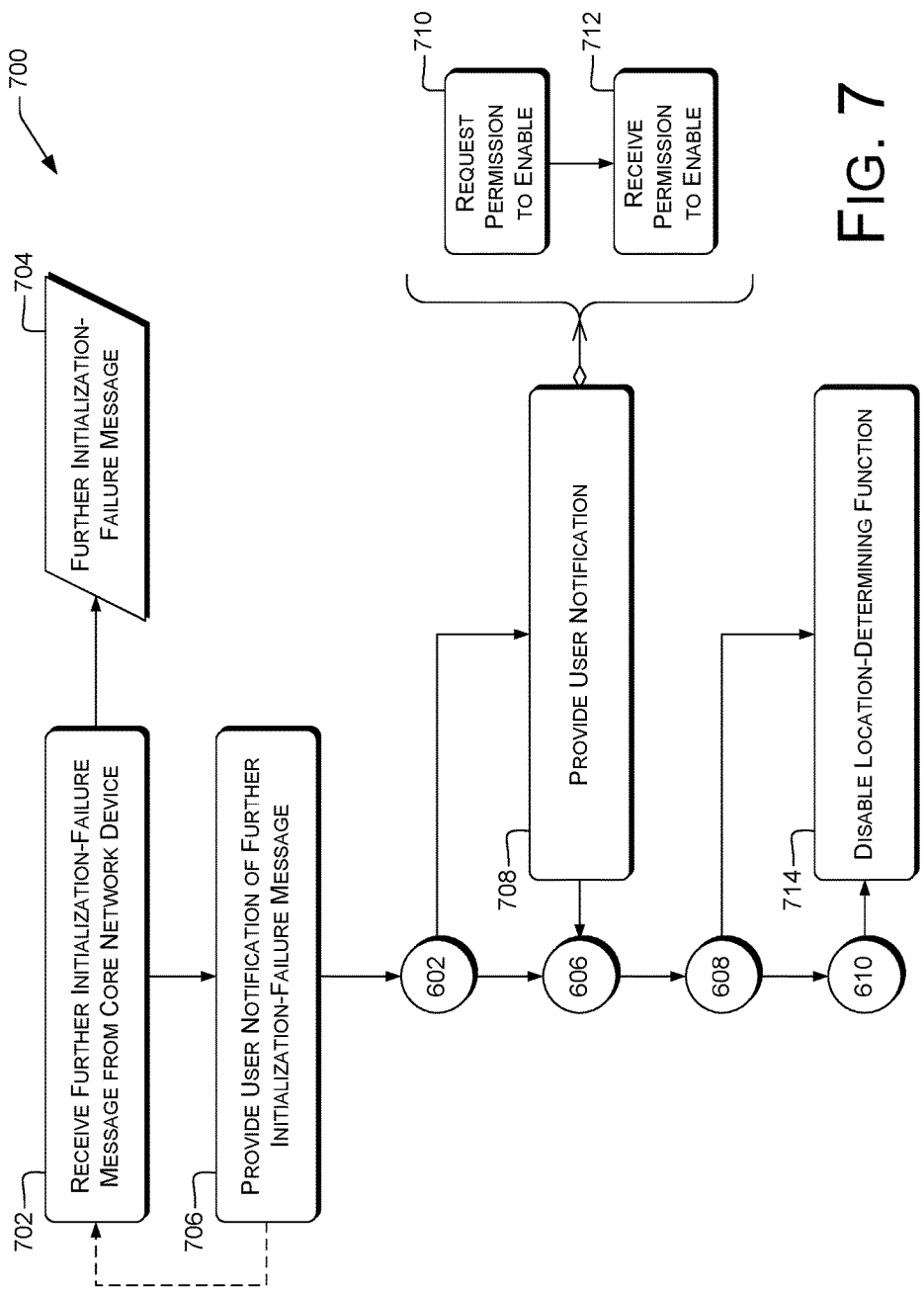
FIG. 7 is a dataflow diagram illustrating example processes for responding to an initialization failure at a terminal according to some implementations, including interacting with a user of the terminal.

FIG. 7 illustrates an example process 700 for responding to an initialization failure at terminal 102, and associated data items. In some examples, blocks 702 or 706 can precede block 602. In some examples, block 706 can follow block 602 or can precede block 606. In some examples, block 712 can follow blocks 608 or 610.

In some examples, at block 702, the control unit can receive, from the core network device, a further initialization-failure message 704, e.g., a SIP 403 response. The term "further" is used merely to distinguish the further initialization-failure message from initialization-failure message 604. For example, the further initialization-failure message 704 can represent first subscription response 212(1), and initialization-failure message 604 can represent second subscription response 212(2).

In some examples, at block 706, the control unit can provide a user notification of the further initialization-failure message 704. For example, the control unit can present a toast notification. Examples are discussed herein, e.g., with reference to block 214.

In some examples, as indicated by the dashed line, blocks 702 and 706 can be performed multiple times. In some examples, blocks 702 and 706 form a second set of operations that can be performed at least once before performing the first set of operations (blocks 602-608). For example, in FIG. 2, the second set of operations can represent receiving a subscription response 212(i) (block 702), and providing notification at block 214(i) (block 706), for multiple values of i, 1≤i<M.

In some examples, at block 708, the control unit can provide a user notification before enabling the location-determining function at block 606. Examples are discussed herein, e.g., with reference to blocks 214(i) or block 314. In some examples, block 708 can include blocks 710 or 712, or can include block 710 and be followed by block 712.

In some examples, at block 710, the control unit can provide, via a user interface, the user notification requesting permission to enable the location-determining function. Examples are discussed herein, e.g., with reference to block 214(1), block 314, or authorization data 316. For example, a toast notification can include a "Yes" button, a "No" button, and the text "Please select 'Yes' to continue." Block 710 can be performed, e.g., before enabling the location-determining function at block 606.

In some examples, at block 712, the control unit can receive, via the user interface, an input indicating the permission to enable the location-determining function. Examples are discussed herein, e.g., with reference to block 314 or authorization data 316. For example, the control unit can receive an event indicating that the "Yes" button was pressed (e.g., touched or clicked).

In some examples using block 712, the input can indicate that the permission to enable the location-determining function is temporary. Examples are discussed herein, e.g., with reference to block 318. For example, the notification can include options for "Turn on and leave on" and "Turn on just for now." Block 712 can include determining that the "Turn on just for now" button was pressed. In some of these examples, block 608 can be followed by block 714.

In some examples not using block 712, block 608 can be followed (e.g., unconditionally) by block 714. In some examples, block 610 can be followed by block 714.

In some examples, at block 714, the control unit can disable the location-determining function after determining the location of the terminal. Examples are discussed herein, e.g., with reference to block 416.

Figure 8:
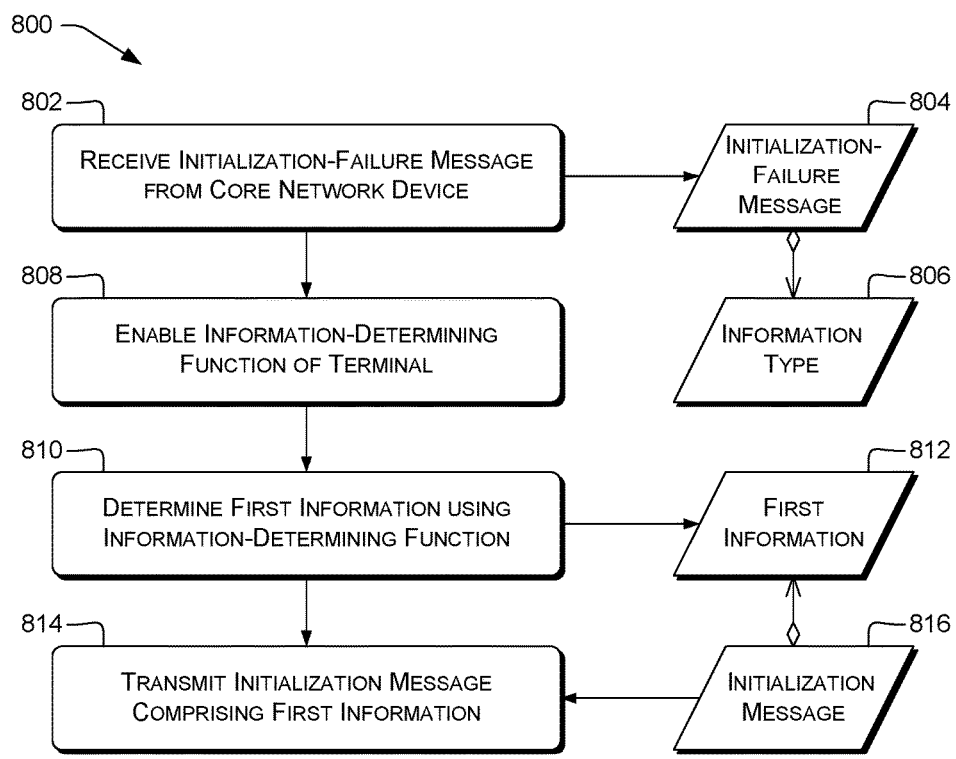
FIG. 8 is a dataflow diagram illustrating an example process for responding to an initialization failure at a terminal by determining information of a particular type according to some implementations.

FIG. 8 illustrates an example process 800 for responding to an initialization failure at a terminal 102 of a network, and associated data items. In some examples, the terminal 102 includes a control unit configured to perform operations described below. In some examples, the control unit performs blocks 802, 808, 810, and 814 in order.

In some examples, at block 802, the control unit can receive, from a core network device, an initialization-failure message 804. The initialization-failure message 804 can indicate: a type 806 of information; and a lack, at the core network device, of valid information that both (i) is of the type 806 and (ii) is associated with the terminal. For example, the type 806 of information can be "location" or "E911 address." Examples are discussed herein, e.g., with reference to block 602. Block 602 is described in the context of location, but other types of initialization-failure messages can be received or processed using corresponding techniques.

In some examples, at block 808, the control unit can enable an information-determining function of the terminal. Examples are discussed herein, e.g., with reference to block 606. Block 606 is described in the context of location and a location-determining function, but other types of information-determining functions can be enabled using corresponding techniques.

In some examples, at block 810, the control unit can determine first information 812 of the type 806 and associated with the terminal using the information-determining function. Examples are discussed herein, e.g., with reference to block 608. Block 608 is described in the context of retrieving location information, but other types 806 of information can be received or processed using corresponding techniques. In some examples, the information-determining function is or includes a location-determining function, and the first information 812 indicates a location of the terminal. In some examples, block 810 can include detecting radios or wireless networks. In some examples in which terminal 102 includes one or more sensors, e.g., a smartphone terminal 102, block 810 can include reading data from at least one of the sensor(s). Example sensors can include a microphone, a light sensor, a camera, an accelerometer, or a temperature sensor.

In some examples, at block 814, the control unit can transmit, to the core network device, an initialization message 816 comprising the first information 812. Examples are discussed herein, e.g., with reference to block 610. Block 610 is described in the context of transmitting location information, but other types 806 of information can be transmitted using corresponding techniques. For example, information can be added as URL parameters to a SIP Request-URI, added to a SIP header, added as a new SIP header (standard or custom), or added to the body of a SIP message (e.g., to an SDP body carried in a SIP INVITE), and similarly for protocols other than SIP.

FIG. 9 illustrates an example process 900 for responding to an initialization failure at terminal 102, and associated data items. In some examples, at least one of blocks 902-906 can precede block 808. In some examples, block 908 can follow blocks 810 or 814.

In some examples, at block 902, the control unit can retrieve authorization data 316 indicating permission to enable the information-determining function. Examples are discussed herein, e.g., with reference to blocks 314 or 502. Block 902 can be performed before enabling the information-determining function (block 808).

In some examples, at block 904, the control unit can provide, via a user interface of terminal 102, a user notification requesting permission to enable the information-determining function. Examples are discussed herein, e.g., with reference to blocks 314, 318, or 706, or 708.

In some examples, at block 906, the control unit can receive, via the user interface, an input indicating the permission to enable the information-determining function. Examples are discussed herein, e.g., with reference to blocks 314, 318, or 706, or 710. Block 906 can be performed before enabling the information-determining function (block 808), in some examples.

In some examples, at block 908, the control unit can disable the information-determining function after determining the first information. Examples are discussed herein, e.g., with reference to blocks 314, 318, 416, or 712.

Illustrative Computing Systems

FIG. 10 is a block diagram illustrating a system 1000, e.g., a telecommunication system, permitting responding to initialization failures according to some implementations. The system 1000 includes a computing device 1002, e.g., a wireless phone or other user equipment, which can represent terminal 102 or 104, FIG. 1. Computing device 1002 can be coupled to a server 1004 via a telecommunications network 1006, which can represent network 106, FIG. 1. The server 1004 can be an example of the core network device(s) 108 or the information server 118 FIG. 1, e.g., a presence server, S-CSCF, RMS, TAS, or other AS.

For clarity of explanation, computing device 1002 will be discussed in the context of a terminal 102, server 1004 will be discussed in the context of a core network device 108, and information server 118 will be discussed separately from server 1004. However, this is not limiting. Except as expressly described herein, components described with reference to computing device 1002 or server 1004 can be used in implementing a called terminal, a calling terminal, or an information server 118.

The network 1006 can include one or more networks, such as a cellular network 1008 and a data network 1010. The network 1006 can include one or more core network(s) connected to terminals, e.g., terminals 102, 104, 200, or 300, via one or more access network(s) 110, 112. In some examples, network 1006 can include any present or future IP-based network technology or evolution of an existing IP-based network technology. In some examples, network 1006 includes an access-agnostic core network, e.g., IMS, and one or more access networks.

The cellular network 1008 can provide wide-area wireless coverage using a technology such as GSM or other 2G cellular technologies; the Universal Mobile Telecommunications System (UMTS) or other 3G cellular technologies; or LTE or other 4G cellular technologies. Example cellular-network technologies can include Code Division Multiple Access (CDMA), Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), GSM/ EDGE RAN (GERAN), Universal Terrestrial RAN (UTRAN), or evolved UMTS Terrestrial RAN (E-UTRAN).

The data network 1010 can include various types of networks for transmitting and receiving data (e.g., data packets), including networks using technologies such as IEEE 802.1* protocols (e.g., 802.11 WIFI or 802.15.1 BLUETOOTH), Asynchronous Transfer Mode (ATM), WIMAX, wireless local area network (WLAN), and other network technologies, e.g., configured to transport IP packets. The data network 1010 can carry over-the-top (OTT) sessions encapsulating, e.g., voice or video data in a way transparent to an underlying packet transport.

In some examples, the cellular network 1008 and the data network 1010 can carry voice or data. For example, the data network 1010 can carry voice traffic using VoIP or other technologies as well as data traffic, or the cellular network 1008 can carry data packets using HSPA, LTE, or other technologies as well as voice traffic. Some cellular networks 1008 carry both data and voice in a packet-switched format. For example, many LTE networks carry voice traffic in data packets according to the VoLTE standard. Some LTE networks can interconnect with WIFI access networks to permit IMS-mediated voice-over-WIFI (VoWIFI) calling. Various examples herein provide origination and termination of, e.g., carrier-grade voice calls on, e.g., circuit-switched (CS) networks or mixed VoLTE/3G networks, and on computing devices 1002 including original equipment manufacturer (OEM) handsets, non-OEM handsets, or computing devices running OTT SIP client software.

Communications between the server 1004 and computing devices such as the computing device 1002 can additionally or alternatively be performed using other technologies, such as Plain Old Telephone Service (POTS) or Public Switched Telephone Network (PSTN) lines, e.g., using Signaling System 7 (SS7) signaling; Data Over Cable Service Interface Specification (DOCSIS); digital subscriber line (DSL); optical (e.g., Synchronous Optical NETwork, SONET) technologies; or other wired network technologies. In some examples, the server 1004 includes or is communicatively connected with an interworking function (IWF) or other device bridging networks, e.g., LTE, 3G, and POTS networks. In some examples, the server 1004 can bridge SS7 traffic from the PSTN into the network 1006, e.g., permitting PSTN customers to place calls to cellular customers and vice versa.

The computing device 1002 can be or include a wireless phone, a wired phone, a tablet computer, a laptop computer, a wristwatch, or other type of computing device. The computing device 1002 can include at least one processor 1012, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). The computing device 1002 can include one or more computer readable media (CRM) 1014, such as memory (e.g., random access memory (RAM), solid state drives (SSDs), or the like), disk drives (e.g., platter-based hard drives), another type of computer-readable media, or any combination thereof. CRM 1014 can store various types of instructions and data, such as an operating system, device drivers, etc. Computer-executable instructions stored in CRM 1014 can be arranged in modules or components. Stored computer-executable instructions can be executed by the processor 1012 to perform the various functions described herein. In some examples, CRM 1014 can be or include nonvolatile memory on a SIM card.

CRM 1014 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information and which can be accessed by the processor 1012. Tangible computer-readable media can include volatile and nonvolatile, removable and non-removable media implemented in any method or technology for storage of information, such as computer-executable instructions, data structures, program modules, or other data.

The computing device 1002 can further include a user interface (UI) 1016, e.g., including an electronic display device 1018, a speaker, a vibration unit, a touchscreen, or other devices for presenting information to a user or receiving commands from the user. The user interface 1016 can include a session-initiating user interface control 132, e.g., a touchscreen button, to indicate a communication session should be initiated. The user interface 1016 or components thereof, e.g., the electronic display device 1018, can be separate from the computing device 1002 or integrated (e.g., as illustrated in FIG. 1) with the computing device 1002.

The computing device 1002 can further include one or more communications interface(s) 1020 configured to selectively communicate via the network 1006. For example, communications interface(s) 1020 can operate one or more radio(s) 1022 of computing device 1002 to communicate via network 1006. Radio(s) 1022 can, e.g., communicate via access network(s) 110 or 112 of cellular network 1008 (e.g., LTE) or data network 1010 (e.g., WIFI). Communications interface(s) 1020 can additionally or alternatively include one or more transceivers or other components configured to communicate using wired connections via the network 1006. In some examples, communications interface(s) 1020, or an individual communications interface 1020, can include or be communicatively connected with transceivers or radio units for multiple types of access networks, e.g., at least two of 2G, 3G, LTE, or WIFI.

In some examples, computing device 1002 includes an antenna 1024 communicatively coupled with the communications interface. The antenna 1024 can include, e.g., a single-band or multi-band antenna. In some examples, the antenna is configured for communications in an IEEE 802.11 (WIFI) band. In some of these examples, the communications interface is configured to communicate with an access network via a protocol in the IEEE 802.11 family.

In some examples, computing device 1002 includes a global navigation satellite system (GNSS) receiver 1026. Examples include a GPS, GLONASS, or Galileo receiver. GNSS receiver 1026 can include an antenna or can be coupled to antenna 1024. GNSS receiver 1026 can include circuitry or logic to detect signals from GNSS satellites and provide latitude, longitude, altitude, or time data based on those signals.

In some examples, CRM 1014 can store service information 1028 used for initializing communications. For example, service information 1028 can include location information of a user of computing device 1002, e.g., stored on a SIM card or on internal memory of a smartphone computing device 1002. In some examples, an absence of service information 1028 can trigger initialization failures, e.g., as discussed herein with reference to block 210.

CRM 1014 can include computer-executable instructions of a client application 1030 or other modules or components. The client application 1030, e.g., a native or other dialer, can permit a user to originate and terminate communication sessions associated with the computing device 1002, e.g., a wireless phone. In some examples, the client application 1030 can cause computing device 1002 to transmit a registration or subscription request, or a session-initiation request such as a SIP INVITE, to the server 1004 or another network-connected device. In some examples, the computer-executable instructions of the client application 1030 can be executed by the processor 1012 to perform various functions described herein, e.g., with reference to at least one of FIGS. 1-9. For example, client application 1030 can represent or perform request processing 126, FIG. 1.

The server 1004 can include at least one processor 1032 and one or more computer readable media 1034. CRM 1034 can be used to store computer-executable instructions of a request-processing module 1036 or other modules or components. Request-processing module 1036 can represent or perform request processing 122, FIG. 1. The computer-executable instructions can be executed by the processor 1032 to perform various functions described herein, e.g., with reference to at least one of blocks 210, 310(*i*), 324, or 326. In some examples, request-processing module 1036 can cause the control unit to check location or other information (e.g., blocks 210(*i*), 310, 326), store location or other information (block 324), or determine initialization-failure messages 408, 604, 704, or 804, e.g., messages including reason data 410 or other information about the cause of an initialization failure.

The server 1004 can include one or more communications interface(s) 1038, e.g., of any of the types described above with reference to communications interface(s) 1020. For example, server 1004 can communicate via communications interface(s) 1038 with information server 118 or with other core network devices 108.

In some examples, processor 1012 and, if required, CRM 1014, are referred to for brevity herein as a "control unit." Other examples of control units can include processor 1032 with, if required, CRM 1034. For example, a control unit can include a CPU or DSP and instructions executable by that CPU or DSP to cause that CPU or DSP to perform functions described herein. In some such examples, client application 1030 or request-processing module 1036 can comprise computer-executable instructions. Additionally or alternatively, a control unit can include an ASIC, FPGA, or other logic device(s) wired (in layout, or via blown fuses or logic-cell configuration data) to perform functions described herein. In some such examples, client application 1030 or request-processing module 1036 can comprise circuitry, configuration data, or other physical structures or data to cause the logic device to perform the corresponding functions described herein.

Example Clauses

A: A terminal of a network, the terminal comprising: an antenna; a communications interface coupled to the antenna and communicatively connectable with an access network; and a control unit configured to perform operations comprising: transmitting, to a core network device of the network via the access network, a first initialization message; subsequently, receiving, from the core network device via the communications interface, an initialization-failure message indicating that the terminal is not authorized to participate in network sessions when connected via the access network due at least partly to a lack, at the core network device, of valid location information of the terminal; subsequently, enabling a location-determining function of the terminal; determining a location of the terminal using the location-determining function; subsequently, disabling the location-determining function; and transmitting, to the core network device via the access network, a second initialization message indicating the location of the terminal.

B: The terminal according to paragraph A, wherein: the initialization-failure message comprises reason data indicating the lack of the valid location information; and the reason data comprises at least one of: a Session Initiation Protocol (SIP) response code; or at least part of a SIP header.

C: The terminal according to paragraph A or B, wherein the second initialization message comprises a Presence Information Data Format Location Object (PIDF-LO) record indicating the location of the terminal.

D: The terminal according to any of paragraphs A-C, wherein the communications interface is configured to communicate with an access network via a protocol in the Institute of Electrical and Electronics Engineers (IEEE) 802.11 family.

E: The terminal according to any of paragraphs A-D, the operations further comprising, before enabling the location-determining function, retrieving authorization data indicating permission to enable the location-determining function.

F: The terminal according to any of paragraphs A-E, wherein: the terminal comprises a global navigation satellite system (GNSS) receiver; the control unit is configured to perform second operations while the location-determining function is enabled; and the second operations comprise determining the location using the GNSS receiver.

G: A method comprising, by a control unit of a network terminal: performing a first set of operations in order, the first set of operations comprising: receiving, from a core network device, an initialization-failure message indicating that the network terminal is not authorized to participate in network sessions due at least partly to a lack, at the core network device, of valid location information of the terminal; enabling a location-determining function of the terminal; and determining a location of the terminal using the location-determining function; and transmitting, to the core network device, an initialization message indicating the location of the terminal.

H: The method according to paragraph G, wherein the initialization message comprises at least one of a Session Initiation Protocol (SIP) REGISTER request or a SIP SUBSCRIBE request.

I: The method according to paragraph G or H, wherein the initialization message comprises a Presence Information Data Format Location Object (PIDF-LO) record indicating the location of the terminal.

J: The method according to any of paragraphs G-I, further comprising, by the control unit, disabling the location-determining function after determining the location of the terminal.

K: The method according to any of paragraphs G-J, further comprising, by the control unit, providing a user notification before enabling the location-determining function.

L: The method according to paragraph K, further comprising, by the control unit and before enabling the location-determining function: providing, via a user interface, the user notification requesting permission to enable the location-determining function; and receiving, via the user interface, an input indicating the permission to enable the location-determining function.

M: The method according to any of paragraphs G-L, wherein: the input indicates that the permission to enable the location-determining function is temporary; and the method further comprises, by the control unit, disabling the location-determining function after determining the location of the terminal.

N: The method according to any of paragraphs G-M, further comprising, by the control unit, before performing the first set of operations, performing the following second set of operations at least once: receiving, from the core network device, a further initialization-failure message; and providing a user notification of the further initialization-failure message.

O: The method according to any of paragraphs G-N, wherein the initialization-failure message comprises a SIP 403 response code.

P: A terminal of a network, the terminal comprising: a communications interface communicatively connectable with an access network; and a control unit configured to perform operations; wherein the operations comprise, in order: receiving, from a core network device, an initialization-failure message indicating: a type of information; and a lack, at the core network device, of valid information of the type and associated with the terminal; enabling an information-determining function of the terminal; and determining first information of the type and associated with the terminal using the information-determining function; and transmitting, to the core network device, an initialization message comprising the first information.

Q: The terminal according to paragraph P, the operations further comprising, before enabling the information-determining function, retrieving authorization data indicating permission to enable the information-determining function.

R: The terminal according to paragraph P or Q, wherein: the terminal further comprises a user interface; and the operations further comprise: providing, via the user interface, a user notification requesting permission to enable the information-determining function; and receiving, via the user interface, an input indicating the permission to enable the information-determining function.

S: The terminal according to any of paragraphs P-R, the operations further comprising disabling the information-determining function after determining the first information.

T: The terminal according to any of paragraphs P-S, wherein: the information-determining function comprises a location-determining function; and the first information indicates a location of the terminal.

U: A computer-readable medium, e.g., a computer storage medium, having thereon computer-executable instructions, the computer-executable instructions upon execution configuring a computer to perform operations as any of paragraphs A-F, G-O, or P-T recites.

V: A device comprising: a processor; and a computer-readable medium, e.g., a computer storage medium, having thereon computer-executable instructions, the computer-executable instructions upon execution by the processor configuring the device to perform operations as any of paragraphs G-O recites.

W: A system comprising: means for processing; and means for storing having thereon computer-executable instructions, the computer-executable instructions including means to configure the system to carry out a method as any of paragraphs G-O recites.

X: A method, comprising performing operations as any of paragraphs A-F or P-T recites.

CONCLUSION

Example techniques herein permit initialization operations to succeed in the face of failures that might otherwise not resolve themselves, e.g., missing location information. This can save both core and access bandwidth. This savings of data transfer over the access network can reduce the time and energy required to conduct the initialization, which can increase performance of network 106 for multiple users, and can increase battery life of a portable terminal 102. Some examples herein reduce signaling traffic, as described herein, by not retrying, at the terminal, a request that will not succeed. The reduction in bandwidth used can reduce the probability of network overload or outage.

Various examples herein relate to services that require location information. For example, a TAS may require location information to satisfy emergency-services requirements, as discussed above. This is not limiting, and examples herein can be used with any combination of mandatory or discretionary network devices that do or do not require location information (for a total of four options per network device). For example, machine-to-machine communications may involve a TAS or other AS that does not require location information.

Some examples herein are described in the context of a VoLTE network with SIP signaling for clarity of explanation. However, other networks and signaling systems employing operations described herein are encompassed within this disclosure. For example, techniques herein can be used with publish/subscribe protocols such as ZEROMQ running over IP networks. Similarly, this disclosure refers to similar operations being performed by protocols evolved from IP, SIP, and VoLTE.

Example data exchanges in the call flow diagrams of FIGS. 2 and 3; example data items depicted as parallelograms in FIGS. 1 and 4-9; example messages in FIGS. 2 and 3; and example process blocks in FIGS. 4-9 represent one or more operations that can be implemented in hardware, software, or a combination thereof to transmit or receive described data or conduct described exchanges. In the context of software, the illustrated blocks and exchanges represent computer-executable instructions that, when executed by one or more processors, cause the processors to transmit or receive the recited data. Generally, computer-executable instructions, e.g., stored in program modules that define operating logic, include routines, programs, objects, modules, components, data structures, and the like that perform particular functions or implement particular abstract data types. Except as expressly set forth herein, the order in which the operations or transmissions are described is not intended to be construed as a limitation, and any number of the described operations or transmissions can be executed or performed in any order, combined in any order, subdivided into multiple sub-operations or transmissions, and/or executed or transmitted in parallel to implement the described processes.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances. Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

Conditional language such as, among others, "can," "could," "might" or "may," unless specifically stated otherwise, are understood within the context to present that certain examples include, while other examples do not include, certain features, elements or steps. Thus, such conditional language is not generally intended to imply that certain features, elements or steps are in any way required for one or more examples or that one or more examples necessarily include logic for deciding, with or without user input or prompting, whether certain features, elements or steps are included or are to be performed in any particular example.

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

In the claims, any reference to a group of items provided by a preceding claim clause is a reference to at least some of the items in the group of items, unless specifically stated otherwise. In the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

Although the subject matter has been described in language specific to structural features or methodological acts, it is to be understood that the subject matter defined in the appended claims is not necessarily limited to the specific features or acts described. Rather, the specific features and acts are disclosed as exemplary forms of implementing the claims.

What is claimed is:

1. A terminal of a network, the terminal comprising:
an antenna;
a communications interface coupled to the antenna and communicatively connectable with an access network;
at least one processor; and
a tangible, non-transitory computer-readable medium storing computer-executable instructions that, when executed by the at least one processor, cause the at least one processor to perform operations comprising: transmitting, to a core network device of the network via the access network, a first initialization message; subsequently, receiving, from the core network device via the communications interface, an initialization-failure message indicating that the terminal is not authorized to participate in network sessions when connected via the access network due at least partly to a lack, at the core network device, of valid location information of the terminal; subsequently, enabling a location-determining function of the terminal; determining a location of the terminal using the location-determining function; subsequently, disabling the location-determining function; and transmitting, to the core network device via the access network, a second initialization message indicating the location of the terminal.

2. The terminal according to claim 1, wherein:
the initialization-failure message comprises reason data indicating the lack of the valid location information; and
the reason data comprises at least one of:
a Session Initiation Protocol (SIP) response code; or
at least part of a SIP header.

3. The terminal according to claim 1, wherein the second initialization message comprises a Presence Information Data Format Location Object (PIDF-LO) record indicating the location of the terminal.

4. The terminal according to claim 1, wherein the communications interface is configured to communicate with an access network via a protocol in the Institute of Electrical and Electronics Engineers (IEEE) 802.11 family.

5. The terminal according to claim 1, the operations further comprising, before enabling the location-determining function, retrieving authorization data indicating permission to enable the location-determining function.

6. The terminal according to claim 1, wherein: the terminal comprises a global navigation satellite system (GNSS) receiver; the operations comprise performing second operations while the location-determining function is enabled; and the second operations comprise determining the location using the GNSS receiver.

7. A method comprising, by a network terminal: performing a first set of operations in order, the first set of operations comprising: receiving, from a core network device, an initialization-failure message indicating that the network terminal is not authorized to participate in network sessions due at least partly to a lack, at the core network device, of valid location information of the terminal; enabling a location-determining function of the terminal; and determining a location of the terminal using the location-determining function; and transmitting, to the core network device, an initialization message indicating the location of the terminal.

8. The method according to claim 7, wherein the initialization message comprises at least one of a Session Initiation Protocol (SIP) REGISTER request or a SIP SUBSCRIBE request.

9. The method according to claim 7, wherein the initialization message comprises a Presence Information Data Format Location Object (PIDF-LO) record indicating the location of the terminal.

10. The method according to claim 7, further comprising, by the network terminal, disabling the location-determining function after determining the location of the terminal.

11. The method according to claim 7, further comprising, by the network terminal, providing a user notification before enabling the location-determining function.

12. The method according to claim 11, further comprising, by the network terminal and before enabling the location-determining function: providing, via a user interface, the user notification requesting permission to enable the location-determining function; and receiving, via the user interface, an input indicating the permission to enable the location-determining function.

13. The method according to claim 7, wherein: the input indicates that the permission to enable the location-determining function is temporary; and the method further comprises, by the network terminal, disabling the location-determining function after determining the location of the terminal.

14. The method according to claim 7, further comprising, by the network terminal, before performing the first set of operations, performing the following second set of operations at least once: receiving, from the core network device, a further initialization-failure message; and providing a user notification of the further initialization-failure message.

15. The method according to claim 7, wherein the initialization-failure message comprises a SIP 403 response code.

16. A terminal of a network, the terminal comprising: a communications interface communicatively connectable with an access network;

at least one processor; and a tangible, non-transitory computer readable medium storing computer-executable instructions that, when executed by the at least one processor, cause the at least one processor to perform operations;

wherein the operations comprise, in order:

receiving, from a core network device, an initialization-failure message indicating:

a lack, at the core network device, of valid location information associated with the terminal;

enabling a location-determining function of the terminal;

determining location information associated with the terminal using the location-determining function; and transmitting, to the core network device, an initialization message comprising the location information.

17. The terminal according to claim 16, the operations further comprising, before enabling the location-determining function, retrieving authorization data indicating permission to enable the location-determining function.

18. The terminal according to claim 16, wherein: the terminal further comprises a user interface; and the operations further comprise: providing, via the user interface, a user notification requesting permission to enable the location-determining function; and receiving, via the user interface, an input indicating the permission to enable the location-determining function.

19. The terminal according to claim 16, the operations further comprising disabling the location-determining function after determining the location information.

* * * * *